(12) United States Patent
Artushkin et al.

(10) Patent No.: US 9,274,230 B2
(45) Date of Patent: Mar. 1, 2016

(54) GNSS SIGNAL PROCESSING METHODS AND APPARATUS

(75) Inventors: Igor Artushkin, Moscow (RU); Alexey Boriskin, Moscow (RU); Dmitry Ivanov, Moscow (RU); Dmitry Kozlov, Moscow (RU); Evgeny Sunitsky, Moscow (RU); Gleb Zyryanov, Moscow (RU)

(73) Assignee: Trimble Navigation Limited, Sunnyvale, CA (US)

( * ) Notice: Subject to any disclaimer, the term of this patent is extended or adjusted under 35 U.S.C. 154(b) by 757 days.

(21) Appl. No.: 13/611,361

(22) Filed: Sep. 12, 2012

(65) Prior Publication Data

US 2013/0141276 A1 Jun. 6, 2013

Related U.S. Application Data

(60) Provisional application No. 61/535,649, filed on Sep. 16, 2011.

(51) Int. Cl.
| | | |
|---|---|---|
| *G01S 19/43* | (2010.01) | |
| *G01S 19/37* | (2010.01) | |
| *G01S 19/42* | (2010.01) | |

(Continued)

(52) U.S. Cl.
CPC .............. *G01S 19/42* (2013.01); *G01S 19/05* (2013.01); *G01S 19/24* (2013.01); *G01S 19/41* (2013.01); *G01S 19/43* (2013.01); *G01S 19/37* (2013.01)

(58) Field of Classification Search
CPC .......... G01S 19/41; G01S 19/43; G01S 19/44
See application file for complete search history.

(56) References Cited

U.S. PATENT DOCUMENTS

| | | |
|---|---|---|
| 5,311,194 A | 5/1994 | Brown |
| 5,323,322 A | 6/1994 | Mueller et al. |

(Continued)

FOREIGN PATENT DOCUMENTS

| | | | |
|---|---|---|---|
| EP | 1 862 809 A1 | 12/2007 | |
| EP | 2 037 291 A1 | 3/2009 | |

(Continued)

OTHER PUBLICATIONS

Wubbena et al, "PPP-RTK: Precise Point Positioning using state-space representation in RTK networks," 18th International Technical Meeting of the Satellite Division of the Institute of Navigation, ION GNSS 2005; Long Beach, CA; United States; Sep. 13, 2005 through Sep. 16, 2005.*

(Continued)

*Primary Examiner* — Gregory C Issing
(74) *Attorney, Agent, or Firm* — Kilpatrick Townsend & Stockton LLP

(57) ABSTRACT

Methods and apparatus are presented for determining position a GNSS rover antenna from single-frequency observations of GNSS signals collected at the antenna over multiple epochs and from correction data for at least one of the epochs. Coded raw data prepared from the single-frequency observations in a binary format are obtained and decoded to obtain decoded raw data. The decoded raw data are used to construct multiple epochs of measurement data of time, range and phase. Correction data are obtained for at least one of the epochs. The measurement data are processed with the correction data in a realtime kinematic positioning engine to obtain a position estimate for each of a plurality of epochs.

22 Claims, 27 Drawing Sheets

(51) Int. Cl.
*G01S 19/41* (2010.01)
*G01S 19/05* (2010.01)
*G01S 19/24* (2010.01)

(56) References Cited

U.S. PATENT DOCUMENTS

| | | | |
|---|---|---|---|
| 5,563,607 A * | 10/1996 | Loomis et al. | 342/357.44 |
| 5,828,336 A | 10/1998 | Yunck et al. | |
| 5,893,044 A | 4/1999 | King et al. | |
| 6,295,021 B1 | 9/2001 | Lichten et al. | |
| 6,324,473 B1 | 11/2001 | Eschenbach | |
| 6,662,107 B2 | 12/2003 | Gronemeyer | |
| 7,117,417 B2 | 10/2006 | Sharpe et al. | |
| 7,292,185 B2 | 11/2007 | Whitehead et al. | |
| 7,312,747 B2 | 12/2007 | Vollath et al. | |
| 7,432,853 B2 | 10/2008 | Vollath | |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,576,690 B2 | 8/2009 | Vollath | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 | 7/2010 | Chen et al. | |
| 7,768,449 B2 | 8/2010 | Gaal et al. | |
| 7,868,820 B2 | 1/2011 | Kolb | |
| 7,961,143 B2 | 6/2011 | Dai et al. | |
| 7,982,667 B2 | 7/2011 | Vollath et al. | |
| 8,018,377 B2 | 9/2011 | Collins | |
| 8,035,552 B2 | 10/2011 | Dai et al. | |
| 8,130,143 B2 | 3/2012 | Liu et al. | |
| 8,237,609 B2 | 8/2012 | Talbot et al. | |
| 8,242,953 B2 | 8/2012 | Dai et al. | |
| 8,260,551 B2 | 9/2012 | Janky et al. | |
| 8,334,807 B2 | 12/2012 | Gaal et al. | |
| 8,368,590 B2 | 2/2013 | Vollath et al. | |
| 8,368,591 B2 | 2/2013 | Talbot et al. | |
| 8,400,351 B2 | 3/2013 | Talbot et al. | |
| 8,542,146 B2 | 9/2013 | Vollath | |
| 8,558,736 B2 | 10/2013 | Talbot et al. | |
| 8,587,475 B2 | 11/2013 | Leandro | |
| 8,614,642 B2 | 12/2013 | Talbot et al. | |
| 8,694,250 B2 | 4/2014 | Talbot et al. | |
| 8,704,708 B2 | 4/2014 | Vollath | |
| 8,704,709 B2 | 4/2014 | Vollath et al. | |
| 2003/0016147 A1 | 1/2003 | Evans | |
| 2003/0048218 A1 | 3/2003 | Milnes et al. | |
| 2005/0055160 A1 | 3/2005 | King | |
| 2005/0064878 A1 | 3/2005 | O'Meagher | |
| 2005/0101248 A1 | 5/2005 | Vollath | |
| 2007/0063894 A1 | 3/2007 | Yu | |
| 2007/0200753 A1 | 8/2007 | Fuchs et al. | |
| 2008/0036654 A1 | 2/2008 | Hansen et al. | |
| 2008/0192242 A1 | 8/2008 | Nichols | |
| 2008/0204312 A1 | 8/2008 | Euler | |
| 2008/0238768 A1 | 10/2008 | Nosworthy | |
| 2008/0258966 A1 | 10/2008 | Sugimoto et al. | |
| 2009/0027264 A1 | 1/2009 | Chen et al. | |
| 2009/0098880 A1 | 4/2009 | Lindquist | |
| 2009/0109090 A1 | 4/2009 | Vollath | |
| 2009/0135057 A1 | 5/2009 | Vollath et al. | |
| 2009/0140914 A1 | 6/2009 | Talbot et al. | |
| 2009/0179792 A1 | 7/2009 | Remondi | |
| 2009/0179793 A1 | 7/2009 | Remondi | |
| 2009/0184869 A1 | 7/2009 | Talbot et al. | |
| 2009/0224969 A1 | 9/2009 | Kolb | |
| 2009/0237298 A1 | 9/2009 | Vollath et al. | |
| 2009/0322600 A1 | 12/2009 | Whitehead et al. | |
| 2010/0033370 A1 | 2/2010 | Lopez et al. | |
| 2010/0141515 A1 | 6/2010 | Doucet et al. | |
| 2010/0156709 A1 | 6/2010 | Zhang et al. | |
| 2010/0177806 A1 | 7/2010 | Normark et al. | |
| 2010/0214162 A1 | 8/2010 | Talbot et al. | |
| 2010/0245168 A1 | 9/2010 | Rollet et al. | |
| 2010/0253575 A1 | 10/2010 | Vollath | |
| 2011/0140959 A1 | 6/2011 | Vollath | |
| 2011/0148698 A1 | 6/2011 | Vollath | |
| 2011/0156949 A1 | 6/2011 | Vollath et al. | |
| 2011/0187590 A1 | 8/2011 | Leandro | |
| 2011/0267228 A1 | 11/2011 | Talbot et al. | |
| 2011/0279314 A1 | 11/2011 | Talbot et al. | |
| 2011/0285587 A1 | 11/2011 | Vollath et al. | |
| 2012/0026038 A1 | 2/2012 | Vollath | |
| 2012/0092213 A1 | 4/2012 | Chen | |
| 2012/0119944 A1 | 5/2012 | Chen | |
| 2012/0154210 A1 | 6/2012 | Landau et al. | |
| 2012/0154214 A1 | 6/2012 | Leandro | |
| 2012/0154215 A1 | 6/2012 | Vollath et al. | |
| 2012/0162007 A1 | 6/2012 | Leandro et al. | |
| 2012/0163419 A1 | 6/2012 | Seeger | |
| 2012/0229332 A1 | 9/2012 | Vollath et al. | |
| 2012/0286991 A1 | 11/2012 | Chen et al. | |
| 2012/0293367 A1 | 11/2012 | Chen et al. | |
| 2012/0306694 A1 | 12/2012 | Chen et al. | |
| 2013/0044026 A1 | 2/2013 | Chen et al. | |
| 2013/0335266 A1 | 12/2013 | Vollath et al. | |
| 2014/0002300 A1 | 1/2014 | Leandro et al. | |
| 2014/0015712 A1 | 1/2014 | Leandro et al. | |

FOREIGN PATENT DOCUMENTS

| | | | |
|---|---|---|---|
| WO | 03/038464 A2 | 5/2003 | |
| WO | 2005/043186 A2 | 5/2005 | |
| WO | 2007/082038 A1 | 7/2007 | |
| WO | WO 2010042441 A1 * | 4/2010 | G01S 19/43 |
| WO | 2010/096159 A2 | 8/2010 | |

OTHER PUBLICATIONS

Li, H. H et al, "Network Based Real Time Precise Point Positioning," Science Direct Advances in Space REsearch 46 (2010) 1218-1224.*
Teunissen et al,"PPP-RTK: Results of CORS Network-Based PPP with Integer Ambiguity Resolution", Journal of Aeronautics, Astronautics and Aviation, Series A, vol. 42, pp. 223-230 (2010).*
International Search Report and Written Opinion of the International Searching Authority mailed May 31, 2011 in International Application No. PCT/US2010/002565 (six pages).
International Search Report and Written Opinion of the International Searching Authority mailed May 31, 2011 in International Application No. PCT/US2010/002564 (seven pages).
International Search Report and Written Opinion of the International Searching Authority mailed May 30, 2011 in International Application No. PCT/US2010/002563 (six pages).
International Search Report and Written Opinion of the International Searching Authority mailed May 26, 2011 in International Application No. PCT/US2010/002562 (six pages).
International Search Report and Written Opinion of the International Searching Authority mailed May 31, 2011 in International Application No. PCT/US2010/002581 (six pages).
International Search Report and Written Opinion of the International Searching Authority mailed Sep. 27, 2011 in International Application No. PCT/US2011/024733 (ten pages).
International Search Report and Written Opinion of the International Searching Authority mailed Oct. 6, 2011 in International Application No. PCT/US2011/024743 (ten pages).
International Search Report and Written Opinion of the International Searching Authority mailed Sep. 26, 2011 in International Application No. PCT/US2011/024763 (ten pages).
International Search Report and Written Opinion of the International Searching Authority mailed Oct. 12, 2012 in International Application No. PCT/US2012/029694 (fourteen pages).
International Search Report and Written Opinion of the International Searching Authority mailed Oct. 16, 2012 in International Application No. PCT/US2012/028670 (eight pages).
International Search Report and Written Opinion of the International Searching Authority mailed Sep. 5, 2012 in International Application No. PCT/US2012/028671 (eight pages).
S. Banville et al., "Satellite and Receiver Phase Bias Calibration for Undifferenced Ambiguity Resolution," Proceedings of the 2008 National Technical Meeting of the Institute of Navigation, San Diego, CA, Jan. 2008, pp. 711-719.

(56) References Cited

OTHER PUBLICATIONS

Y. Bar-Sever et al., "A new model for GPS yaw attitude," Journal of Geodesy, vol. 70, No. 11, Nov. 1996, pp. 714-723 (abstract only).
G. Bierman, Factorization Methods for Discrete Sequential Estimation, Academic Press, Inc., 1977, 129 pp.
S. Bisnath et al., "Precise Orbit Determination of Low Earth Orbiters with GPS Point Positioning," Proceedings of the 2001 National Technical Meeting of the Institute of Navigation, Long Beach, CA, Jan. 2001, pp. 725-733.
P. Collins, "Isolating and Estimating Undifferenced GPS Integer Ambiguities," Proceedings of the 2008 National Technical Meeting of the Institute of Navigation, San Diego, CA, Jan. 2008, pp. 720-732.
P. Collins et al., "Precise Point Positioning with Ambiguity Resolution using the Decoupled Clock Model," Proceedings of the 21st International Technical Meeting of the Satellite Division of the Institute of Navigation (ION GNSS 2008), Savannah, GA, Sep. 2008, pp. 1315-1322.
P. Collins et al., "Accessing and Processing Real-Time GPS Corrections for Precise Point Positioning . . . Some User Considerations," Proceedings of the 18th International Technical Meeting of the Satellite Division of The Institute of Navigation (ION GNSS 2005), Long Beach, CA, Sep. 2005, pp. 1483-1491.
Y. Gao et al., "A New Method for Carrier-Phase-Based Precise Point Positioning", Navigation, Journal of the Institute of Navigation, vol. 49, No. 2, Summer 2002, pp. 109-116.
"GNSS Solutions: Precise Point Positioning and Its Challenges, Aided-GNSS and Signal Tracking," Inside GNSS, Nov./Dec. 2006, pp. 16-21.
M. Gabor et al., "Satellite-Satellite Single-Difference Phase Bias Calibration as Applied to Ambiguity Resolution", Navigation, Journal of The Institute of Navigation, vol. 49, No. 4, Winter 2002-2003, pp. 223-247.
M. Ge et al., "Resolution of GPS carrier-phase ambiguities in Precise Point Positioning (PPP) with daily observations," Journal of Geodesy, Jul. 2008, vol. 82, Issue 7, pp. 389-399.
A. Hauschild et al., "Real-time Clock Estimation for Precise Orbit Determination of LEO-Satellites," Proceedings of the 21st International Technical Meeting of the Satellite Division of the Institute of Navigation (ION GNSS 2008), Savannah, GA, Sep. 2008, pp. 581-589.
P. Heroux et al., "GPS Precise Point Positioning Using IGS Orbit Products," Phys. Chem. Earth (A), vol. 26, No. 6-8. pp. 573-578, 2001.
P. Heroux et al., "GPS Precise Point Positioning with a Difference," presented at Geomeatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.
"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
D. Lapucha et al., "Comparison Of The Two Alternate Methods Of Wide Area Carrier Phase Positioning," Proceedings of the 17th International Technical Meeting of the Satellite Division of The Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of The Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of The Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of The Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of the Institute of Navigation, Monterey, CA, Jan. 2006, pp. 564-573.
S. Lo et al., "GNSS Album: Images and Spectral Signature of the New GNSS Signals," Inside GNSS, May/Jun. 2006, pp. 46-56.
W. Melbourne, "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of the Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827, May 9, 2000, two pages.
G. Seeber, Satellite Geodesy, 2d. Ed., 2003, p. 31.
P. Tetrault et al., "CSRS-PPP: An Internet Service for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wubbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.

\* cited by examiner

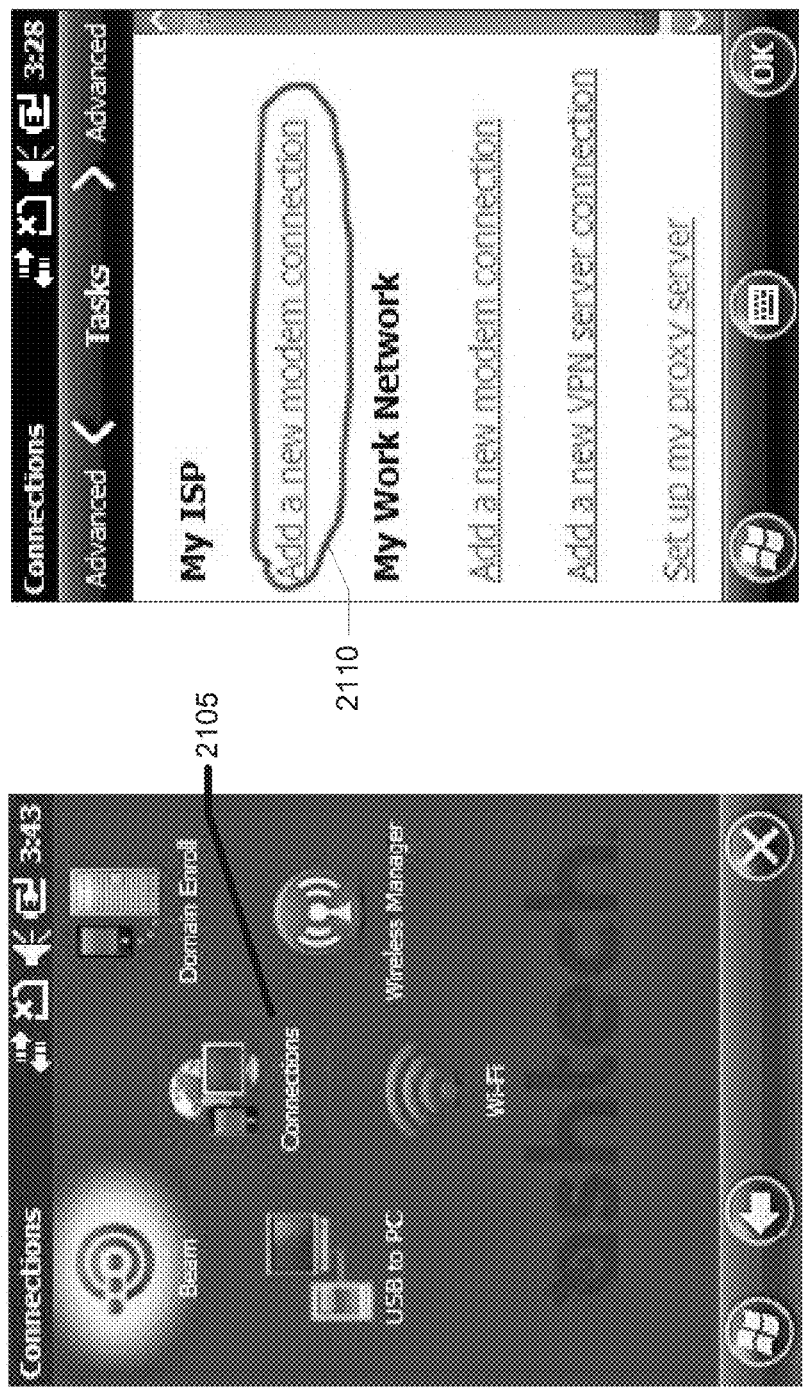

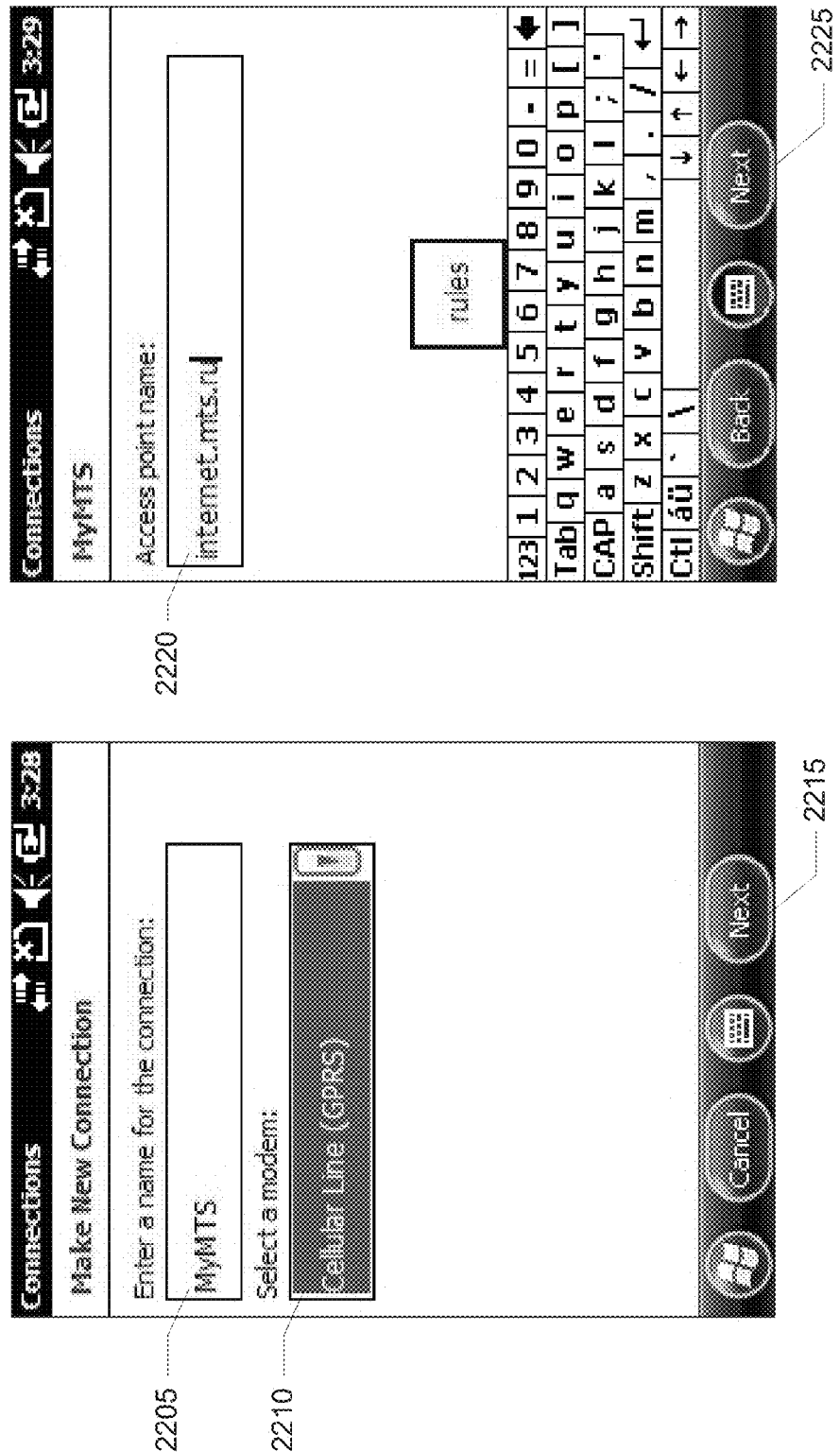

GNSS SIGNAL PROCESSING METHODS AND APPARATUS

CROSS REFERENCE TO RELATED APPLICATIONS

The following is related hereto and incorporated herein in its entirety by this reference: U.S. Provisional Application for Patent No. 61/535,649 filed 16 Sep. 2011.

TECHNICAL FIELD

The present invention relates to the field of Global Navigation Satellite Systems GNSS). More particularly, the present invention relates to methods and apparatus for processing of GNSS data from a single-frequency GNSS receiver with corrections to obtain up to float RTK position estimates.

BACKGROUND

In recent years there has been a penetration of consumer and professional GNSS (Global Navigation Satellite System) technologies into the same markets. Consumer-grade devices are seeking better accuracy at the lowest price. Professional-grade solutions are seeking price/size/consumption reduction keeping ultimate positioning performance. The battle is on to achieve sub-meter positioning performance for post-processed and real-time GIS (Geographic Information System/s).

Today, GIS handhelds represent a significant GIS market. In terms of accuracy, there is a very wide choice, ranging from a few-meter real-time solutions (low-end GIS) to centimeter-level, post-processed and real-time solutions (high-end GIS).

Typical high-end GIS players are Trimble GeoExplorer 6000 Series, Topcon GRS-1, and Ashtech MobileMapper 100. All of them include their own professional GNSS inside (usually GPS+GLONASS, L1 or L1&L2), good quality internal antenna (usually L1-only; sometimes L1&L2), the possibility to connect high-grade, external L1 or L1&L2 antenna, built-in GSM module & antenna, possibility to support high-rate raw data output for post-processing, and the RTK rover function.

Having such a device, end users can get a full spectrum of accuracies (from meter up to centimeter) by selecting the proper antenna, recording raw data and running post-processing at the office or activating the RTK function, etc.

But these are expensive devices ($3000+ depending on options), which makes them suitable only for some applications and circumstances.

All of the low-end GIS devices use consumer-grade L1 GPS (and SBAS) chips. Here the obvious leader is the SiRF Star III chip. Typical low-end GIS players are Topcon FC-25A, Ashtech MobileMapper 10, Spectra Precision Nomad, Trimble Juno series, Magellan eXplorist Pro 10 and some others. All of them deliver a few meter-level, real-time accuracy using an internal SiRF chip (i.e. $3^{rd}$ party consumer GPS) as search&tracking&position engine. This means that the difference in real-time performance between units is only defined by the difference of quality in the design of the internal antenna.

These are quite inexpensive units ($400+ depending on options), which can be used in the widest range of GIS applications all over the world.

Thus, there is a strong differentiation between low-end and high-end GIS solutions as for the accuracy and the price.

At the same time, there exists the so-called medium-end GIS market, which requires meter-level, real-time and sub-meter level post-processing accuracies.

This niche can potentially be occupied by both low- and high-end devices. It is quite clear what needs to be done when moving from high- to medium-end: Reducing the price! It is clear but not so easy to do because pricing for professional solutions is also driven by capabilities other than GNSS positioning (e.g. data capacity, ruggedness, connectivity, etc).

There are lots of consumer-grade handheld devices available on the market. Generally they are fitted with a consumer GNSS chipset (e.g. SiRF, Ublox, etc.), a low-cost internal antenna element and a powerful application processor to run different user applications. More and more of these devices have large touch screens, built-in GSM modules and the possibility to connect a higher grade, external GNSS antenna. Such a configuration is ideal for a wide variety of GIS jobs. What needs to be improved in these devices is just the chip performance to deliver an accurate enough (differential) position!

To date, we do not see consumer-grade devices with such an advanced position engine. Today, the primary market for such chips is still PNDs (Portable Navigation Devices) where sub-ten meter position is usually enough for most applications. Improving position accuracy is not required, while ultra-high sensitivity, indoor tracking with minimum size and power consumption and low cost are still the primary requirements for such chips.

SUMMARY

Some embodiments of the invention provide methods and/ or apparatus for determining a position of an antenna of a GNSS rover from single-frequency observations of GNSS signals collected at the antenna over multiple epochs and from correction data for at least one of the epochs. Coded raw data prepared from the single-frequency observations in a binary format are obtained and decoded to obtain decoded raw data. The decoded raw data are used to construct multiple epochs of measurement data of time, range and phase. Correction data are obtained for at least one of the epochs. The measurement data are processed with the correction data in a realtime kinematic positioning engine to obtain a position estimate for each of a plurality of epochs.

In some embodiments the single frequency is the GNSS L-1 frequency. In some embodiments the coded raw data are prepared by a consumer-quality GNSS receiver. In some embodiments the consumer-quality GNSS receiver comprises at least one of: a MobileMapper 10 GNSS receiver, a SiRF GNSS receiver chip, a Trimble Juno41 handheld having a Ublox chip, and a Ublox chip.

In some embodiments the consumer-quality GNSS receiver has at least one of the following characteristics: (a) narrow band RF front end filter, (b) super low cost chip, (c) L1 only, (d) super raw (not RINEX-like) data output, (e) fast GNSS signal acquisition engine, (f) ability to track super weak GNSS signal, (g) simplified PVT (position/velocity/ time) engine (accuracy is not a key factor), (h) limited support of correcting (e.g. RTK) data, and (i) low (e.g. 1 Hz) data/ position update rate.

In some embodiments the correction data comprise one of: RTK base station data, L-Band correction data, and SBAS correction data.

In some embodiments the decoding comprises correcting raw range data to obtain corrected range data. In some embodiments decoding comprises correcting time data to obtain constructed time data. In some embodiments the position estimate for each of a plurality of epochs comprises determining a float ambiguity for each of a plurality of epochs.

In some embodiments constructing phase comprises restoring carrier phase for a time sample k as:

$$PHI(k)=PHI(k-1)+D(k)$$

wherein PHI(k) is the carrier phase observable for a time sample k, PHI(k−1) is the carrier phase observable for the previous time sample k−1, and D(k) is the Doppler observable for the time sample k.

In some embodiments processing the measurement data with the correction data in a realtime kinematic positioning engine to obtain a position estimate for each of a plurality of epochs occurs with minimum latency following collection of observations of GNSS signals at the antenna.

Further within the scope of the invention is a non-transitory computer-usable medium having computer readable instructions which enable a device to perform a method in accordance with an embodiment of the invention.

BRIEF DESCRIPTION OF DRAWING FIGURES

These and other aspects and features of the present invention will be more readily understood from the embodiments described below with reference to the drawings, in which:

FIG. 21A shows a selection screen of an application in accordance with some embodiments of the invention;

FIG. 21B shows a selection screen of an application in accordance with some embodiments of the invention;

FIG. 22A shows a connection entry screen of an application in accordance with some embodiments of the invention;

FIG. 22B shows a connection entry screen of an application in accordance with some embodiments of the invention;

DETAILED DESCRIPTION

Professional Performance with Consumer GPS

Figure 1A:
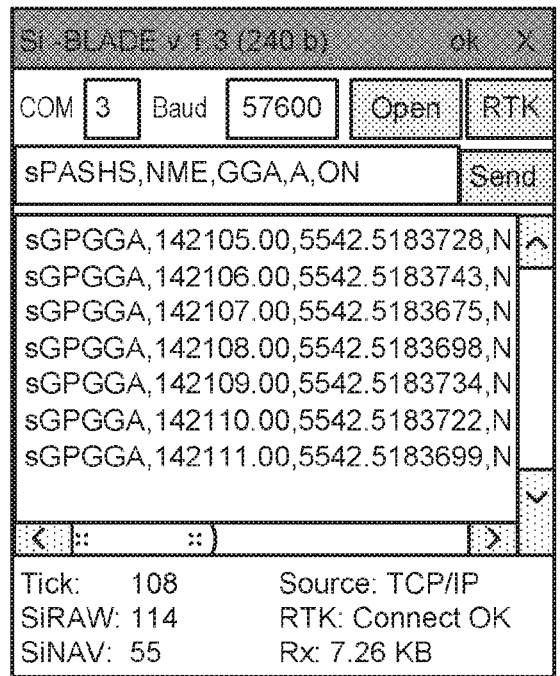
FIG. 1A shows a graphical user interface in accordance with some embodiments of the invention.

These last years, we have observed an obvious penetration of consumer and professional GNSS (Global Navigation Satellite System) technologies into the same markets. Consumer-grade devices are seeking better accuracy at the lowest price. Professional-grade solutions are seeking price/size/consumption reduction keeping ultimate positioning performance. At the moment, the battle is on to achieve sub-meter positioning performance for post-processed and real-time GIS (Geographic Information System/s).

Embodiments of the present invention provide a compromise solution, using consumer-grade hardware and signal tracking algorithms (e.g. SiRF or Ublox based), but applying a professional-grade positioning engine (Ashtech based).

Examples of consumer-grade hardware include the MobileMapper 10 GNSS receiver have a SiRF GNSS receiver chip, the Trimble Juno41 handheld having a Ublox chip, and other receivers having a SiRF GNSS receiver chip or a Ublox chip.

Such consumer-grade receivers have one or more of the following features:

Narrow band RF front end filter

Super low cost chip

L1 only

Often super raw (not RINEX-like) data output which originally served debug only

Fast GNSS signal acquisition engine

Ability to track super weak GNSS signal

Quite simple PVT (position/velocity/time) engine (accuracy is not a key factor)

Limited support of correcting (e.g. RTK) data

Low (e.g. 1 Hz) data/position update rate

The following demonstrates the detailed concept of this approach. We explain what the Ashtech BLADE™ engine is, and how it can be run on different targets and operating systems. BLADE is a position engine designed to process professional-grade GNSS raw [and differential] data. That is why its usage for consumer-grade observations acquired with cheap GPS antennas requires a lot of parameter tuning. The following enumerates BLADE engine subroutines where such a tuning has been performed to get what we finally call "Si-BLADE".

We provide different field results (static occupation, stop and go). We detail the conditions in which meter/sub-meter performance can be expected for RTK and post-processing when using such a consumer-grade handheld fitted with an internal or external antenna.

Today, GIS handhelds represent a significant GIS market. In terms of accuracy, there is a very wide choice, ranging from a few-meter real-time solutions (low-end GIS) to centimeter-level, post-processed and real-time solutions (high-end GIS).

Typical high-end GIS players are Trimble GeoExplorer 6000 Series, Topcon GRS-1, and Ashtech MobileMapper 100. All of them include their own professional GNSS inside (usually GPS+GLONASS, L1 or L1&L2), good quality internal antenna (usually L1-only; sometimes L1&L2), the possibility to connect high-grade, external L1 or L1&L2 antenna, built-in GSM module & antenna, possibility to support high-rate raw data output for post-processing, and the RTK rover function.

Having such a device, end users can get a full spectrum of accuracies (from meter up to centimeter) by selecting the proper antenna, recording raw data and running post-processing at the office or activating the RTK function, etc.

But these are expensive devices ($3000+ depending on options), which makes them suitable only for some applications and circumstances.

All of the low-end GIS devices use consumer-grade L1 GPS (and SBAS) chips. Here the obvious leader is the SiRF Star III chip.

Typical low-end GIS players are Topcon FC-25A, Ashtech MobileMapper 10, Spectra Precision Nomad, Trimble Juno series, Magellan eXplorist Pro 10 and some others. All of them deliver a few meter-level, real-time accuracy using an internal SiRF chip (i.e. $3^{rd}$ party consumer GPS) as search&tracking&position engine. This means that the difference in real-time performance between units is only defined by the difference of quality in the design of the internal antenna.

These are quite inexpensive units ($400+ depending on options), which can be used in the widest range of GIS applications all over the world.

From the above, one can see that there is a strong differentiation between low-end and high-end GIS solutions as for the accuracy and the price.

At the same time, there exists the so-called medium-end GIS market, which requires meter-level, real-time and sub-meter level post-processing accuracies.

This niche can potentially be occupied by both low- and high-end devices. It is quite clear what needs to be done when moving from high- to medium-end: Reducing the price! It is clear but not so easy to do because pricing for professional solutions is also driven by capabilities other than GNSS positioning (e.g. data capacity, ruggedness, connectivity, etc).

There are lots of consumer-grade handheld devices available on the market. Generally they are fitted with a consumer GNSS chipset (e.g. SiRF, Ublox, etc.), a low-cost internal antenna element and a powerful application processor to run different user applications. More and more of these devices have large touch screens, built-in GSM modules and the possibility to connect a higher grade, external GNSS antenna. Such a configuration is ideal for a wide variety of GIS jobs. What needs to be improved in these devices is just the chip performance to deliver an accurate enough (differential) position.

To date, we do not see consumer-grade devices with such an advanced position engine. Today, the primary market for such chips is still PNDs (Portable Navigation Devices) where sub-ten meter position is usually enough for most applications. We mean that improving position accuracy is not required, while ultra-high sensitivity, indoor tracking with minimum size and power consumption and low cost are still the primary requirements for such chips. In the future, consumer chip designers will probably improve their positioning performance, possibly by introducing differential modes.

Today, positioning performance of consumer GNSS (still mostly GPS only) integrated into GIS handhelds cannot satisfy all users. When it comes to sub-meter requirements, they still have to buy professional-grade devices whose price is not comparable to low-cost consumer-grade handhelds. Does that mean that low-cost consumer hardware has no chance to fight in the medium-end GIS market? No, it does not mean that.

We have developed a technology and related software achieving stable sub-meter position accuracy with a handheld built around a consumer-grade GPS (GNSS) chipset. The key parts of this technology are the following:

Stream original chipset binary data for real time usage

Correct interpretation of these data and their real-time conversion to standardized (RINEX-like) pseudo-range and carrier phase observations Configuring built-in GSM module to request and receive differential correcting data (e.g. RTK Network)

Running Ashtech BLADE positioning engine on application processor to get sub-meter level, Float RTK performance Using the same BLADE algorithms in the office software to get even better post-processed results (compared to real-time)

The ability to deliver sub-meter accuracy through post-processing has been proved by Ashtech with the MobileMapper 6 GIS handheld. See "MobileMapper 6 White Paper: Meter-Level Mapping Accuracy with Post-Processing," Magellan Navigation, Inc., September 2008.

As a new step forward, we address here all the details of such an approach applied to real time, organized as follows:

First, we discuss all the implementation problems arising when pairing a consumer chipset (and its associated binary data) with an application processor (and Windows Mobile OS running an external application such as a professional RTK engine from Ashtech). We also enumerate the primary raw data quality issues leading to some challenging engine tuning and validation.

Then we describe how our solution (application) works and how it can interface with other applications.

And finally we demonstrate what sub-meter, real-time performance is, and in which conditions it can be achieved.

All the data and software refer to the Ashtech MobileMapper 10 receiver (replacement of the former MobileMapper 6) featuring the SiRF Star III chip. At the same time, one can expect the same performance for units featuring the same chip, similar internal GSM module and comparable internal antenna element.

We use the term "Si-BLADE" to refer to a real-time Windows Mobile application running the Ashtech BLADE RTK engine with consumer-grade raw observables [and RTK correcting data].

It is a well-known challenge to get professional-grade performance with handheld devices. But when a handheld device uses a consumer, $3^{rd}$ party GPS chip and a super-low-cost antenna element, then meeting professional performance can be much more challenging compared to the battle described in "Professional Care of GNSS Handheld with Internal Antenna: What Position Accuracy One Can Expect," Gleb Zyryanov, Igor Artushkin, Dmitry Ivanov, Evgeny Sunitsky, Proceedings of ION-GPS '2010, Portland, Oreg.

The problems that need to be addressed are:
Converting original chipset raw data into RINEX-like epoch data structures
Process and flag (and possibly deselect) them
Run professional position engine with these data [and RTK correcting stream]
Tune position engine to match resulting data specific
These four problems are clarified below.

Many consumer GPS devices do not generate RINEX-like observables, e.g. the SiRF Star III chip does not generate carrier phase, which is a key element for getting meter/sub-meter accuracy. Also SiRF binary data contain a number of proprietary-type supplementary information that must be correctly transformed into some universal indicators like SNR (Signal-to-Noise Ratio), cumulative tracking time, loss of lock counters, etc. That is why the SiRF-to-RINEX-like conversion is not a trivial one.

What's specific to consumer high-sensitivity search/tracking engines, in addition to being associated with low-grade antenna elements, is their propensity to deliver very erroneous data (these data can still be valuable for ten-meter-level positioning, but can be very undesirable for meter-level positioning). These data must be properly detected, flagged and possibly removed. Of course it can be done inside the position engine itself (e.g., BLADE), but it is desirable to make initial pre-processing for masking them, prior to using them in positioning. The most important outcome of this procedure is the formalized indicators of pseudo-range and carrier phase quality. These indicators are processed to yield the best weighting scheme inside the position engine.

Running a separate position engine with consumer raw data is only half a battle. It is desirable to re-use a maximum of existing professional technology (including source code). It must be noted that when speaking about position engine, we actually mean not only position itself but also very powerful differential decoders and differential processors supporting every standardized differential data existing today.

A position engine working with high-grade (professional) raw data quality cannot at the same time be the best when processing consumer chip data collected with a low-end internal antenna. That is why specific tuning is needed to have equally the best position performance with the same position engine regardless of the raw data source. And ideally, all this tuning must be controlled by a minimum set of configuration commands and should not lead to any additional branches in the source code.

We have solved the four problems above. This has finally led to creating Si-BLADE, an application that can be installed and run easily on a wide variety of open Window Mobile platforms using for example the SiRF Star III chipset.

Si-BLADE technology is generally applicable to every consumer chipset capable of generating raw observables. Most notably, we made sure that Si-BLADE is applicable to Ublox data. However, we are focusing here on SiRF Star III because most of the modern GIS products (including Ashtech MobileMapper 10) integrates this chipset.

It must be noted that Si-BLADE is only a position engine application. It should just be considered as an application transferring some GPS functionality (real-time positioning) from a consumer chip to an application processor. Si-BLADE is not integrated in any user field application, but can interface with it using Ashtech style serial settings and NMEA sentences.

The application can work in standalone, SBAS (Space-Based Augmentation System), DGPS (Differential Global Positioning System) and RTK (Real-Time Kinematic) modes, depending on the availability of correcting data. The application can additionally record original chipset raw data for further post-processing, as well as convert them into some standardized messages, e.g. RTCM-3 observation/navigation messages (RTCM-3 is a GNSS Data Transmission Standard of the Radio Technical Commission for Maritime Services).

For convenience, a GUI (Graphical User Interface) has been created to control Si-BLADE and monitor/store its results. This GUI is just a simple terminal and should not be considered as proper end user interface. The primary Si-BLADE control window is shown at 100 in FIG. 1A.

Figure 1B:
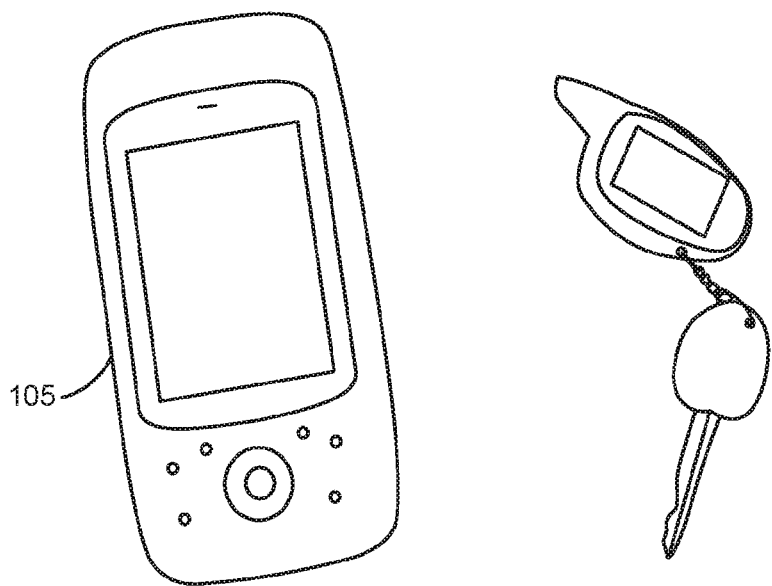
FIG. 1B shows an Ashtech MobileMapper 10 capable of running some embodiments in accordance with the invention.

As already mentioned, Si-BLADE can be ported on different Windows Mobile platforms. It is shown at 105 in FIG. 1B running on an Ashtech MobileMapper 10. While the unit can use an external antenna, all the performance figures presented below were obtained with MobileMapper 10's own internal antenna.

Before presenting the performance, we summarize here the specificity of the RINEX-like data the position engine (e.g., BLADE) has to process:
The restored carrier phase has all the attributes of a true carrier phase, except that it has a fractional bias that is different for each satellite, and it can also change on each signal re-acquisition. This is what we have to pay for a restored carrier. This means that any Double Difference (DD) processing involving carrier phase restored from SiRF Star III chip data cannot lead to DD carrier ambiguity fixed to integer. This is not a strong limitation because, for L1-only handhelds fitted with a cheap internal antenna, fixing ambiguity to integer, if ever possible, cannot be reliable.
The receiver clock bias in restored carrier phases and pseudo-ranges appears to be different and drifting. For engines applying DD processing, this divergence does not affect final performance. However, some operations in which raw data are involved can be affected. For example, effective long smoothing of pseudo-ranges by carrier-phase is not possible with such data.
It is not possible to retrieve SBAS correcting data from a SiRF Star III chip. That is why Si-BLADE can run the SBAS differential mode only with SBAS corrections received via a built-in communication module.
Because of low-band, front-end RF and cheap antenna element, the resulting observables are affected by strong multipath errors which can be ten times higher compared to professional, wide-band, front-end RF/antenna in the same conditions.
Because of the high sensitivity of the SiRF acquisition/tracking engine, satellites with very low SNR (Signal-to-Noise Ratio) are tracked and provide observables. In most cases, these observables are properly flagged or even deselected. At the same time, the probability to have observables corresponding to reflected (not line-of-sight) signal is very high in shaded/urban environment.

Among many possible tests, we selected only three:

Long continuous static occupation to see steady-state accuracy

Auto-reset mode to plot the so-called convergence tubes

Kinematic test to see real-life field performance

While Si-BLADE can generate any type of positions (depending on correcting data availability), we will only be focusing on RTK performance. In each test, we only applied default settings for Si-BLADE, and more particularly no "a priori" static assumption was made when processing static data.

While Si-BLADE is a real-time application, it can also be run off-line, with pre-collected raw and differential data. The following sections shows the performance deduced from off-line and on-line Si-BLADE runs.

Steady-State Accuracy

Figure 2:
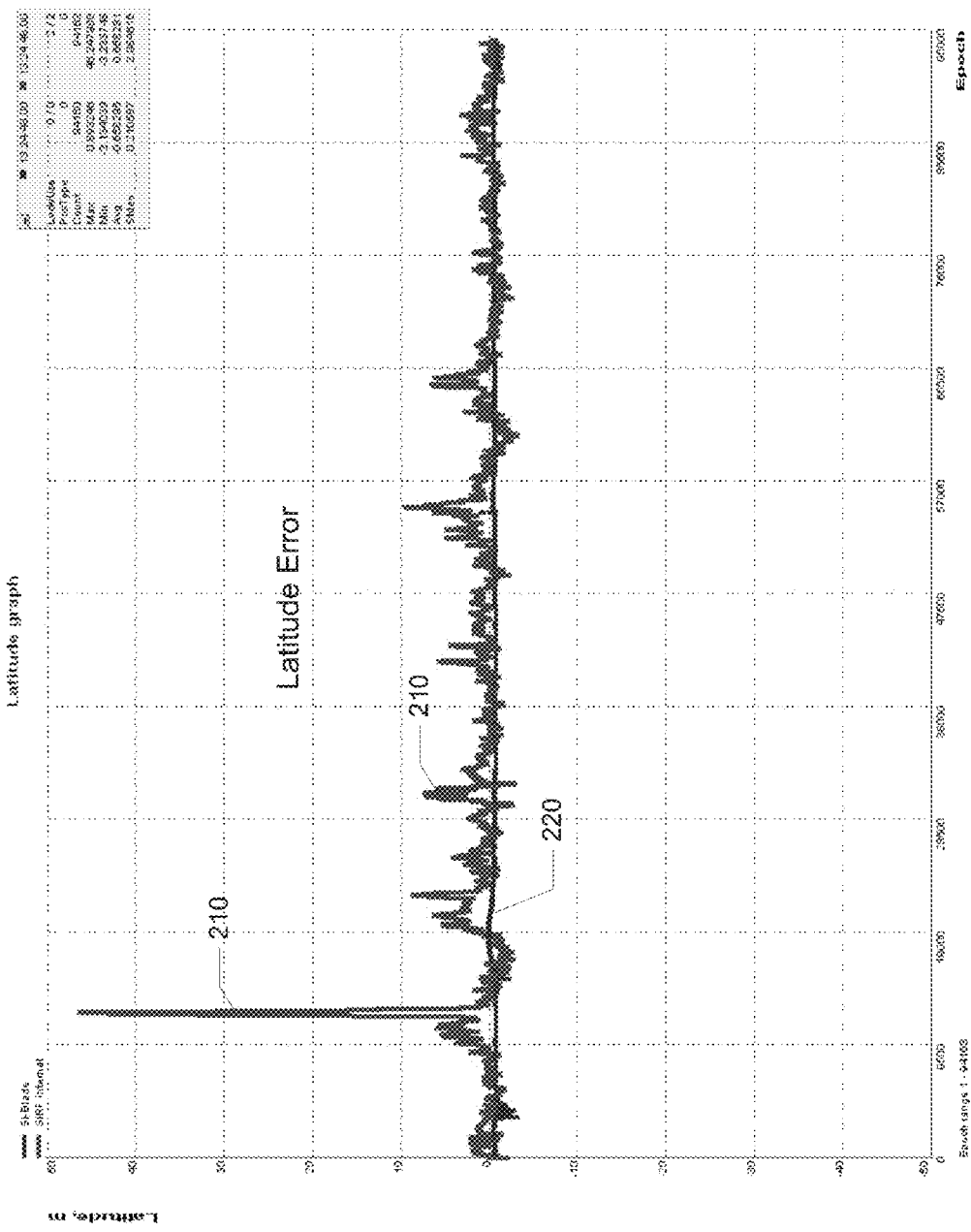
FIG. 2 shows errors in latitude for two position estimation approaches.
Figure 3:
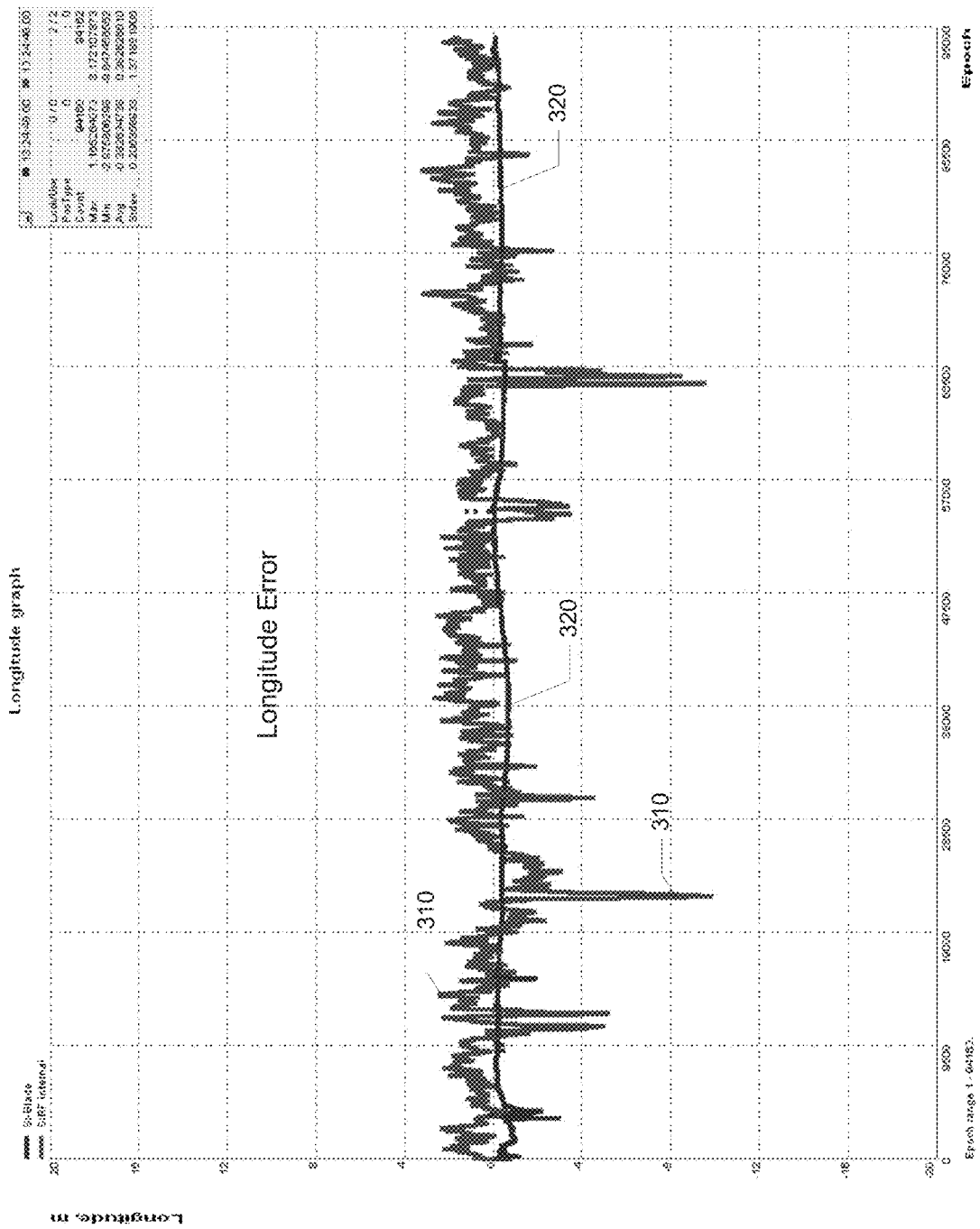
FIG. 3 shows errors in longitude for the position estimation approaches of FIG. 2.

The unit was set up on the roof at the Ashtech Nantes office (France) in open sky conditions. It was run for 24 hours (no battery recharging needed along the way: the outstanding operating life of the MobileMapper 10 battery allows uninterrupted, all-day data recording). FIG. 2 and FIG. 3 show errors on latitude and longitude for 2 positions:

Internal SiRF Star III chip position (standalone). Anticipating possible questions, we must note that SiRF Star III SBAS differential position is even worse than its standalone position when working in Europe (EGNOS).

Position computed by Si-BLADE (RTK float) with the same SiRF raw data and RTK correcting data from base receiver 1 km apart.

FIG. 2 shows latitude error for SiRF at 210 (light-colored plot) and latitude error for BLADE at 220 (dark-colored plot). FIG. 3 shows longitude error for SiRF at 310 (light-colored plot) and latitude error for BLADE at 320 (dark-colored plot. Resulting position statistics are presented in Table 1.

TABLE 1

| | Position error statistic | | |
|---|---|---|---|
| Position engine | HRMS Meters | H50 (CEP) Meters | H95 Meters |
| SiRF Star III | 3.28 | 1.37 | 4.29 |
| Si-BLADE | 0.29 | 0.17 | 0.57 |

It's worth reminding that Si-BLADE did not make any static assumption when processing these data. At the same time, the above figures are for steady-state accuracy, assuming continuous tracking and no BLADE resets. It is now very interesting to learn more about the convergence to steady-state accuracy.

Convergence Tubes

This test is intended to show the time needed to get meter-level RTK performance after Si-BLADE startup. We collected continuously open-sky raw data with MobileMapper 10 and processed them against two open-sky professional reference stations, 1 km and 53 km apart.

Figure 4B:
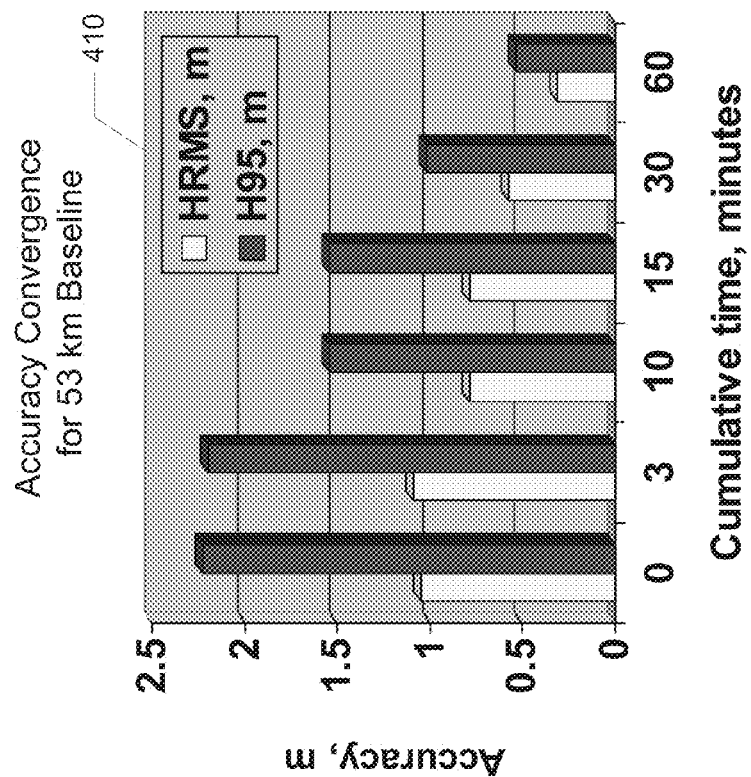
FIG. 4B shows accuracy convergence for a 53 km baseline.
Figure 4A:
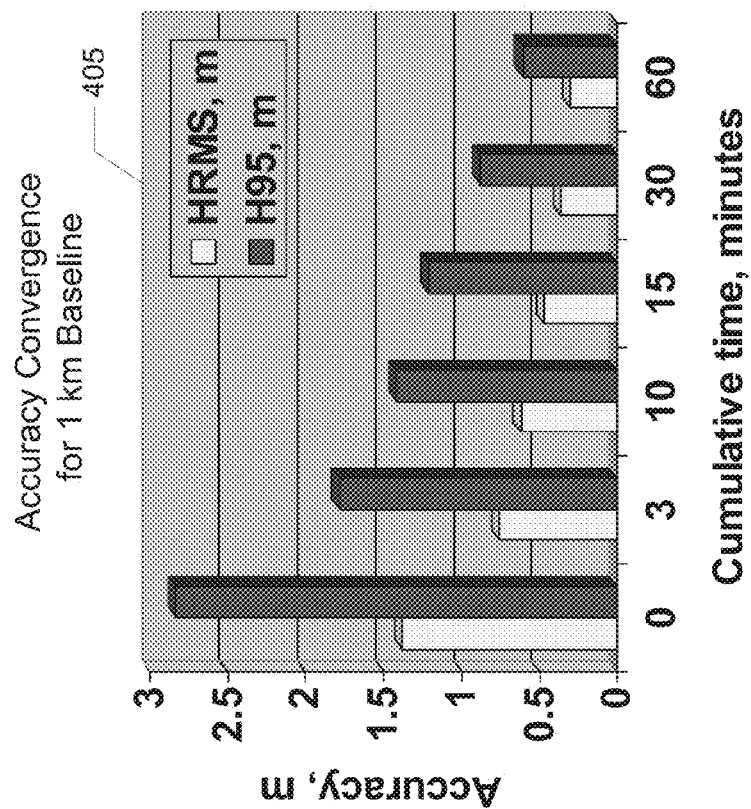
FIG. 4A shows accuracy convergence for a 1 km baseline.

Off-line processing included Si-BLADE reset every one hour. Having 24 independent, 1-hour trials, we built the so-called convergence tubes as shown in FIG. 4A and FIG. 4B. FIG. 4A shows at 405 accuracy convergence for 1 km baseline. FIG. 4B shows at 410 accuracy convergence for 53 km baseline.

One can see that the convergence figures are almost the same for 1 km and 53 km baselines. Also we can see that convergence is not so fast as one would like to see. Remember however that the receiver was installed on a roof and affected by strong and slow multipath from the roof. That is why the initial error is quite high and the convergence is quite slow. In real-life field environment, reflection from the ground can be not so strong while kinematic jobs usually lead to effective multipath randomization and better position performance.

Kinematic Test

Figure 5:
FIG. 5 shows a view of a test area.

We had Si-BLADE running in real time using GPRS (General Packet Radio Services) and receiving RTK corrections from a nearby NTRIP (Networked Transport of RTCM via Internet Protocol) base station located a few kilometers away. We imitated the well-known GIS job which is area data collection. FIG. 5 shows a view of the test environment.

Figure 6:
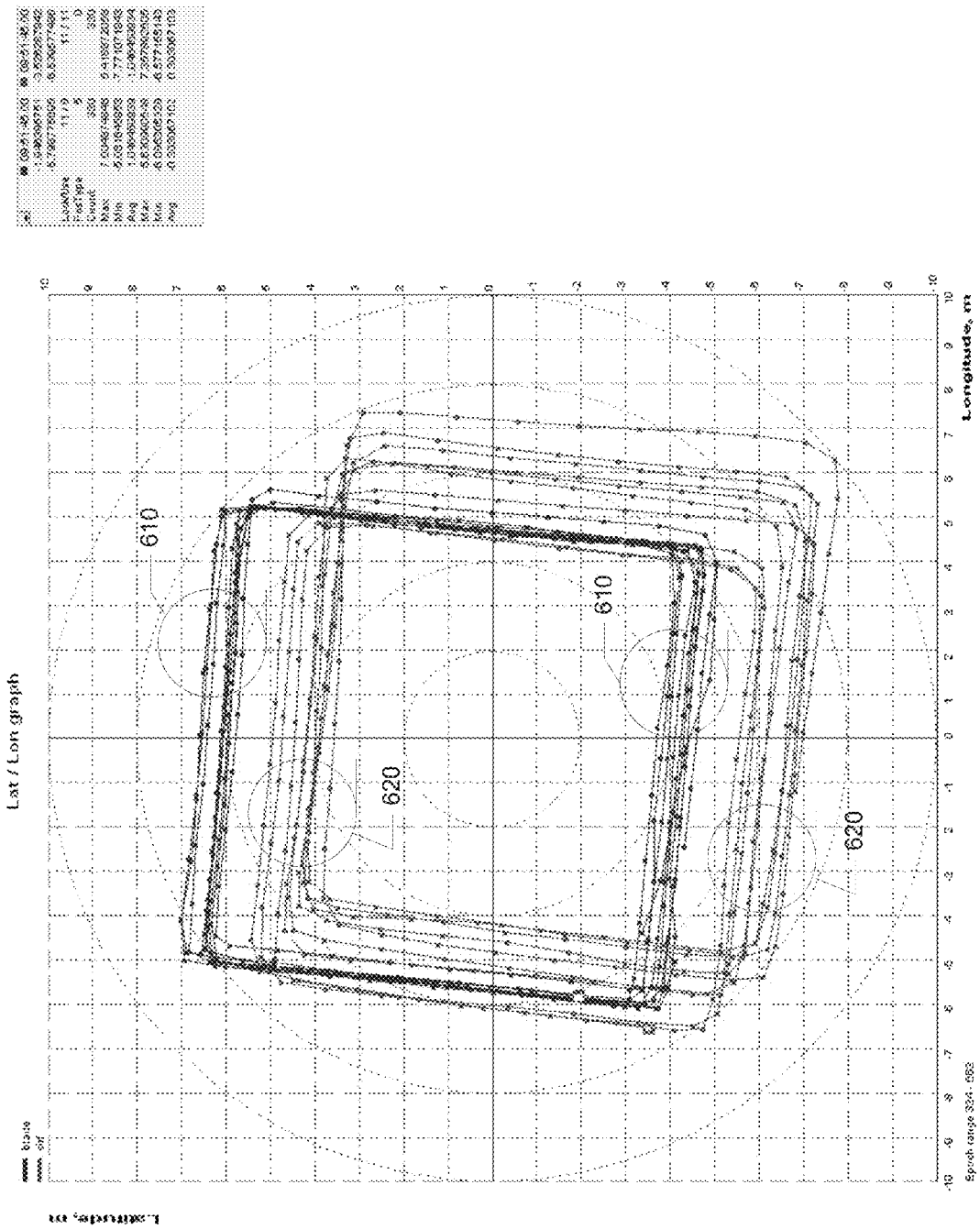
FIG. 6 shows plots of data acquired in the test area of FIG. 5 for two position estimation approaches.

For this test, we are not providing results in numerical form but instead we simply show the scattering of the plots corresponding to ten continuous loops around the tested area. FIG. 6 shows the original SiRF positions (dark-colored loops identified by rings 610) and BLADE positions (light-colored loops identified by rings 620) computed from the same SiRF raw data. The results speak for themselves.

Figure 7:
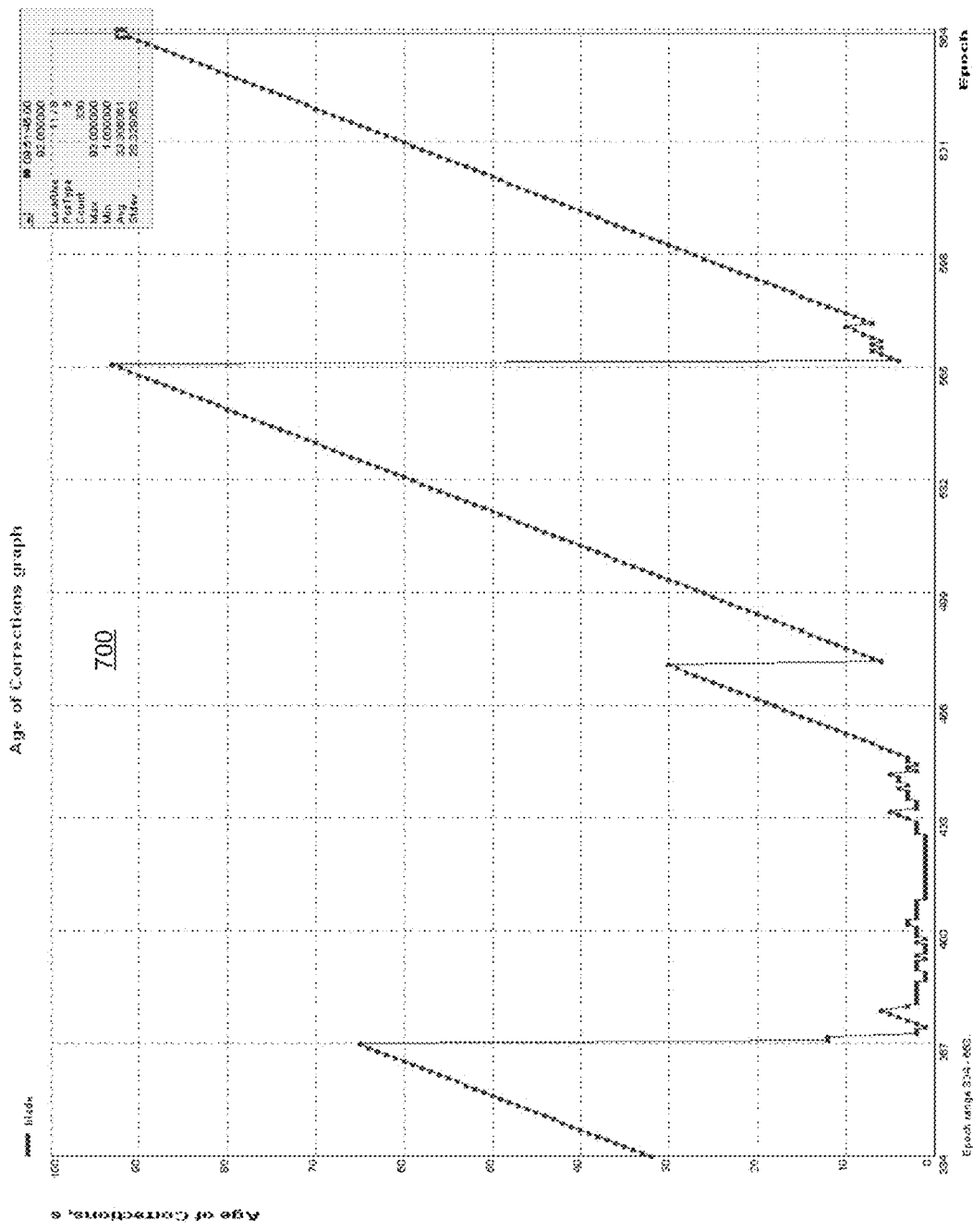
FIG. 7 is a graph showing the age of correction data used in a test.

It should also be noted that during this test, the GPRS connection was very unstable and the data link was often cut off for more than one minute. FIG. 7 shows at 700 the variations of the age of RTK corrections during the test. Notwithstanding this, BLADE managed to generate very good and stable Float RTK solution thanks to applied APIS technology. See "APIS: Advanced Position Increment Solution for different GNSS Applications," Dmitry Ivanov, Valery Morgoon, Gleb Zyryanov, Proceedings of ION-GPS '2009, Savannah, Ga.

There are lots of low-end GIS handhelds on the market at a price ranging from $400 to $1000 and beyond. Some are manufactured by Professional GNSS players like Ashtech and Topcon, but some others are manufactured by consumer electronics vendors like Magellan. Nevertheless the GNSS (GPS) core is the same for most of them, which is the consumer SiRF Star III chip.

The requirements for GIS accuracy are growing year after year. At the same time, the cost pressure also dictates some guidelines. That is why using low-cost handhelds for meter/sub-meter GIS jobs is one of the obvious trends nowadays.

The above is an example of synergy between consumer-grade GPS search/tracking and professional-grade (differential) positioning. We have shown that:

Raw data from a consumer-grade chip can efficiently be used in real time and post-processing High-end professional position engine can be integrated into Windows Mobile handheld devices Position engine can efficiently be tuned for these specific raw data to deliver meter/sub-meter GIS performance Up to now, users had to buy quite expensive handhelds with professional GNSS modules inside when meter/sub-meter level accuracy was required. This paper shows that another alternative is possible.

Potentially, users get a very attractive possibility to migrate their consumer-grade devices from low- to medium-end GIS. And it will be even more natural if their devices contain a GSM module inside. In this case, no additional hardware will be needed to run the RTK rover function.

Once again, it is very important to emphasize that the Si-BLADE application not only includes a position module as such, but also a professional differential decoder and processor supporting all known standardized protocols (CMR/

CMR+, RTCM2, RTCM3) allowing such a unit to be used with any type of reference data.

We are nowadays witnesses that some consumer chip manufactures claimed GLONASS and Galileo ready function, i.e., consumers enter the GNSS world.

The BLADE engine is a GNSS engine. This means that once consumer chipsets start supporting other-than-GPS signals, these raw data can be processed by Si-BLADE without any dramatic modification/tuning.

A portable software module to obtain real-time up to float RTK position based on SiRF raw observations was introduced by the following paper which is incorporated herein by this reference: Boriskin, Alexey, Ivanov, Dmitry, Sunitskiy, Evgeny, "Professional Performance with Consumer GPS: Where and How it is Possible?," *Proceedings of the 24th International Technical Meeting of The Satellite Division of the Institute of Navigation* (ION GNSS 2011), Portland, Oreg., September 2011, pp. 3281-3287. Until this introduction, it was not available in products as a realtime feature.

The possibility to get float RTK performance in postprocessing mode is available in the Ashtech MM6 product since 2008.

Embodiments of the invention are applicable to professional devices (LS, GIS, PND) featuring low cost, usually consumer grade, GNSS chipset (SiRF, Ublox) but requiring much better real time position quality compared to internal (own) chipset position.

Prior-art devices and methods use own consumer grade position as user position. It is known that consumer devices for consumer markets are never optimized to have a position better than few meters. That is why consumer chipsets usually feature powerful search/tracking GNSS engine (including indoor tracking capability which is very important for consumer user), but not so powerful position engine (say, 2 meters or 5 meters errors cannot usually affect consumer user acceptance).

So generally it is not possible to use a consumer chipset's own position result for professional applications requiring meter/sub-meter real time accuracy. We describe here how it can be done.

This can be possible because of 3 high level factors
Most of the known consumer grade chipsets allow streaming raw tracking data from them.
Most of the known devices have a GSM module inside which can be used for reception of external correction data
Most of the known devices have a quite powerful application processor (with sufficient memory) to run different applications These factors respectively allow us to:
Stream/parse/convert original raw data into some standardized form (e.g. RINEX-like) which professional position engines can accept and process
Run differential decoders/processors to apply incoming correcting streams (e.g. from NTRIP Network) to professional position engine
Run real time professional position engine on application processor We describe here the primary actions to:
run a professional position engine on an application processor and
get the desired performance from it "To run" a professional position engine refers not to creating from scratch an advanced position engine, but re-using a powerful professional grade position engine which can include up-to-RTK rover functions inside. So a professional position engine must be:

scalable (to extract it from complete GNSS firmware source code)
portable (to be able to run on Windows Mobile, Android, etc)
effective (to be able to run efficiently on the same processor with user application)

Figure 8:
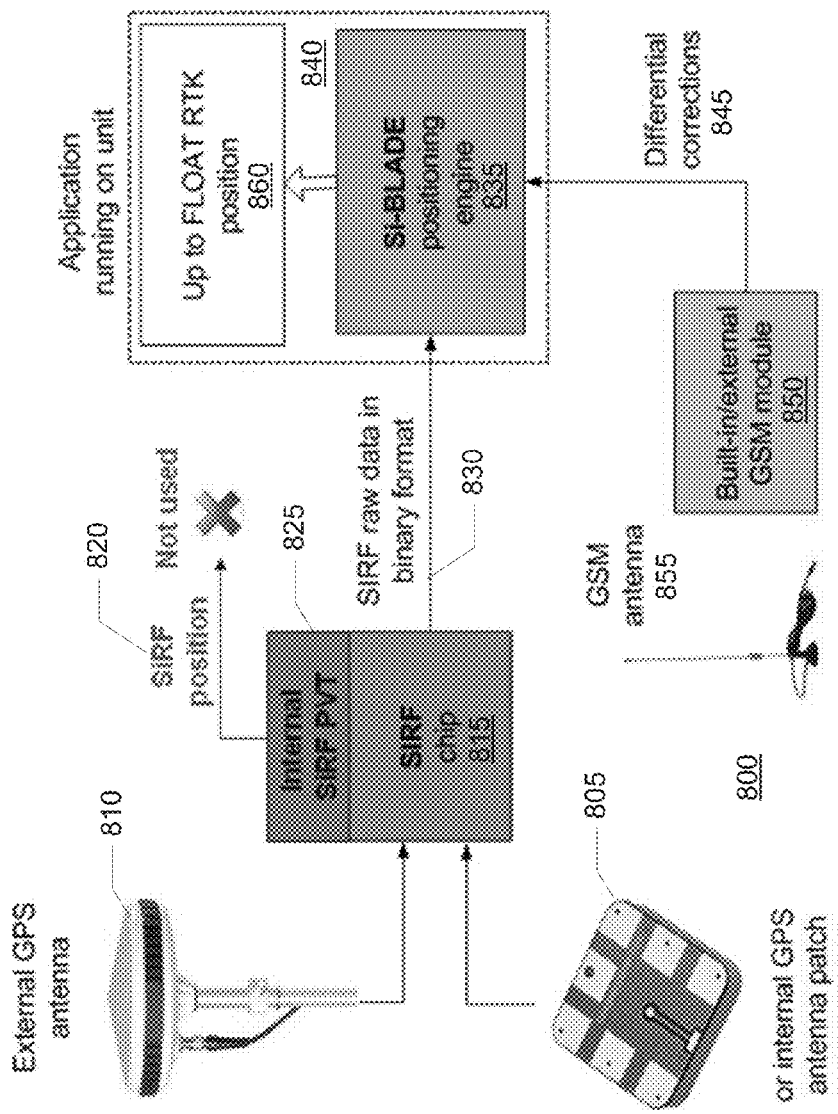
FIG. 8 shows a system in accordance with some embodiments of the invention.

"To get" desired performance refers to two kinds of actions:
Appropriate real time converting of the widest variety of consumer grade proprietary raw data into unified RINEX-like form with proper data quality indicators
Routine tuning of a professional position engine (initially tuned for professional-grade GNSS raw data) to insure appropriate operation with low-grade raw data FIG. 8 shows at 800 a high-level view of a system in accordance with some embodiments of the invention. GNSS signals intercepted by GNSS antenna (which may be an internal antenna 805 or an external antenna 810) enter the consumer chip 815 (e.g., a SiRF chip). Along with generating its own internal position 820 using an internal PVT (position/velocity/time) process 825, the chip 810 can generate raw tracking data 830 (in proprietary but known binary format). A position engine 835 (e.g., Si-Blade) residing on an application processor 840 accepts these data 830, and externally-generated differential corrections data 845 received at a communications module (e.g., a built-in GSM module or external GSM telephone) 850 via a communications link such as a GSM (Global System for Mobile Communication) signal received at a GSM antenna 855. Position engine 835 generates a position estimate 860 (up to Float RTK quality) as an alternative to, or in addition to, the consumer chip's position estimate 815.

Figure 9:
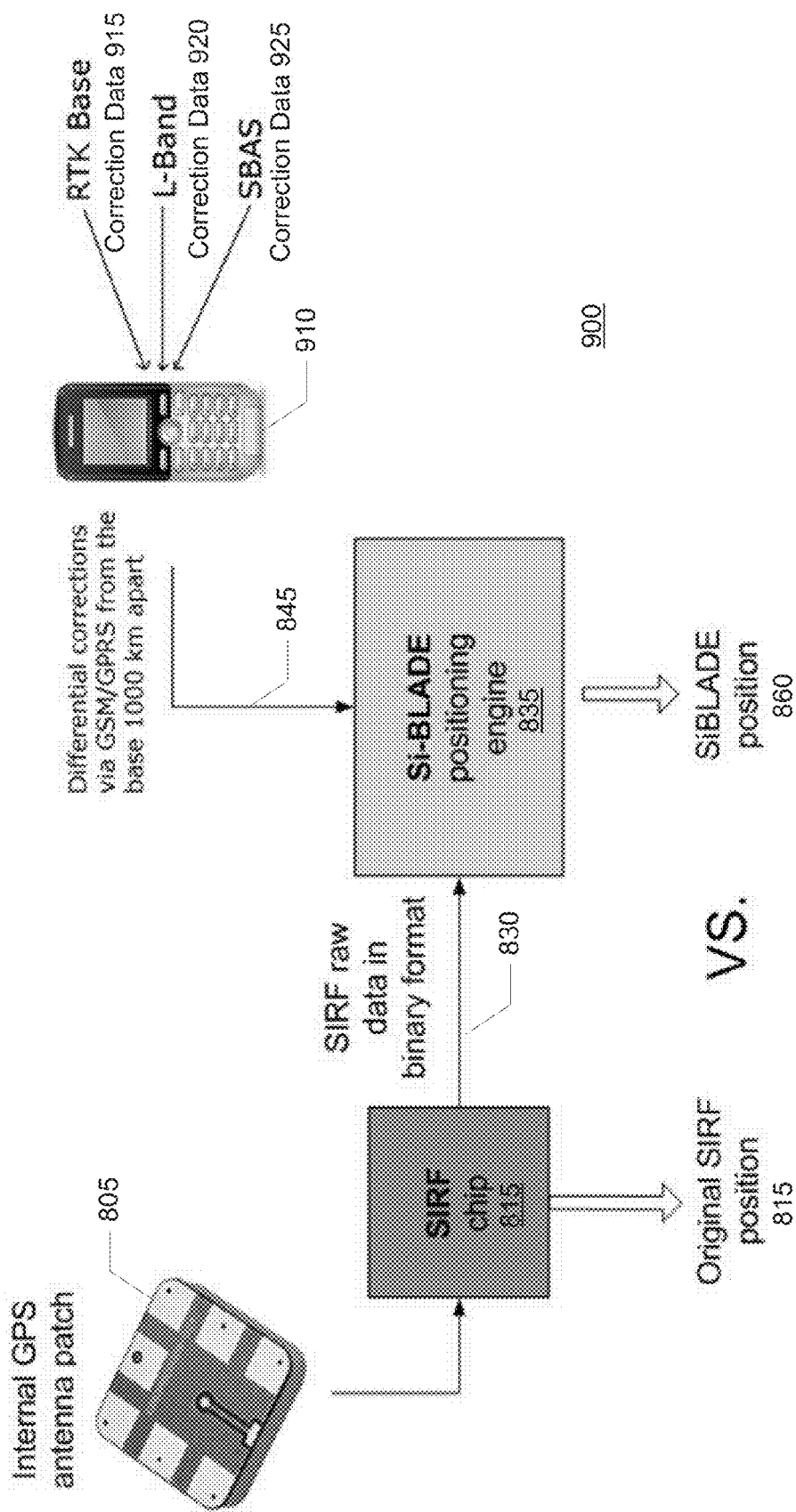
FIG. 9 shows a system in accordance with some embodiments of the invention.

FIG. 9 shows at 900 an embodiment in accordance with the invention in which the position engine (e.g., Si-Blade) application 835 running on an application processor generates a computed position estimate 860 while the chip 815 generates it own internal chip position estimates 815. In general the Si-Blade position estimate 860 is differentially corrected (up to RTK quality), which is possible because the handheld device contains a GSM module inside. The GSM module 850 is represented in FIG. 9 as a mobile telephone 910. It is supposed that a GSM/GPRS-capable reference (RTK Base) station is placed nearby the receiver (e.g. within 1000 km), so its correction data 915 can be used to compute position estimates in the Si-Blade position engine 835. Alternatively, GSM/GPRS reference data can be presented in the form of State Space Corrections (SSR) 920 as originally provided by L-band service, e.g. Omnistar or Trimble RTX service. Alternatively, GSM/GPRS reference data can be presented in the form of raw SBAS data frames 925 containing orbit and ionosphere corrections.

Real Time Converting Original Raw Data (e.g, SiRF)

A professional position engine (including an RTK engine) is typically capable of processing a wide variety of different GNSS (GPS, GLONAS, GALILEO, etc.) signals (L1CA, L2C, L2P, etc.) by some unified algorithm. Most of such engines are built as a recurrent position state machine (e.g., a Kalman Filter) whose estimates additionally to many other parameters include so called carrier-phase ambiguity. This means that professional position engine is capable of processing not only pseudo-range (unambiguous) observables, but also carrier phase (ambiguous) observables. These pseudo-range and carrier phase data appear to the position engine as some 'standardized' variables, e.g., clearly described in the RINEX (Receiver Independent Exchange) format. For purposes of the examples described here, we use the term "RINEX-like" as a general term for such data.

The reality is that the original raw data from consumer chipset are often far from RINEX-like appearance. For example, SiRF III original data do not provide carrier phase at all. To allow running a professional (up to RTK) position engine, one must try to restore if possible carrier phase data from the original data.

Fortunately the SiRF chip can generate Doppler observables (D) and these Doppler are not a true carrier phase derivative, but exact carrier phase increments over 1 sec intervals. This allows restoring carrier phase for a time sample k as follows:

$$PHI(k)=PHI(k-1)+D(k)$$

and does not insert any dynamic errors. PHI(k) is the carrier phase observable for a time sample k, PHI(k−1) is the carrier phase observable for the previous time sample k−1, and D(k) is the Doppler observable for the time sample k.

Restored carrier phase can be initialized by an arbitrary number for each Satellite/Signal and accumulative process must be properly re-initialized once the quality of D cannot satisfy good tracking conditions.

The arbitrary number used for carrier initialization cannot affect the final performance, because this number will be processed by the professional position engine as a carrier phase ambiguity for which the exact value actually does not matter.

At the same time, it must be noted that the restored carrier phase cannot have one important attribute of a "professional" carrier phase: the restored carrier phase cannot contain what we call integer ambiguity which feature could be used to fix Double Difference (DD) ambiguity to integer in an RTK position engine. In other words, only so called Float RTK (that where carrier phase ambiguity is never fixed to integer value of cycles) can be applied to restored carrier phase. This miss however is not so important because with consumer grade data quality and cheapest antenna element, the potential ability to fix integer ambiguity can have nothing common with reality.

It must be emphasized that 1 Hz raw data streamed from SiRF chipset must not lose any epoch. Losing any epoch will mean discontinuity in restored carrier phase and will result in a position estimate jump in a professional position engine. Fortunately, SiRF raw data are streamed reliably and no missed epochs were experienced.

The *SiRF Binary Protocol Reference Manual* provides detailed information about the SiRF Binary protocol—the standard protocol used by the SiRFstar family of products. See, for example, *SiRF Binary Protocol Reference Manual*, SiRF Technology, Inc., Part Number 1050-0041, Revision 2.4, November 2008, the entire content of which is incorporated herein by this reference.

Original SiRF raw data provide a number of different corrections and quality indicators which all must be carefully used in carrier phase accumulation process. The complete data from SiRF Messages ID 7, 28, and 41 are used to generate RINEX like observables to run Si-BLADE.

Figure 10:
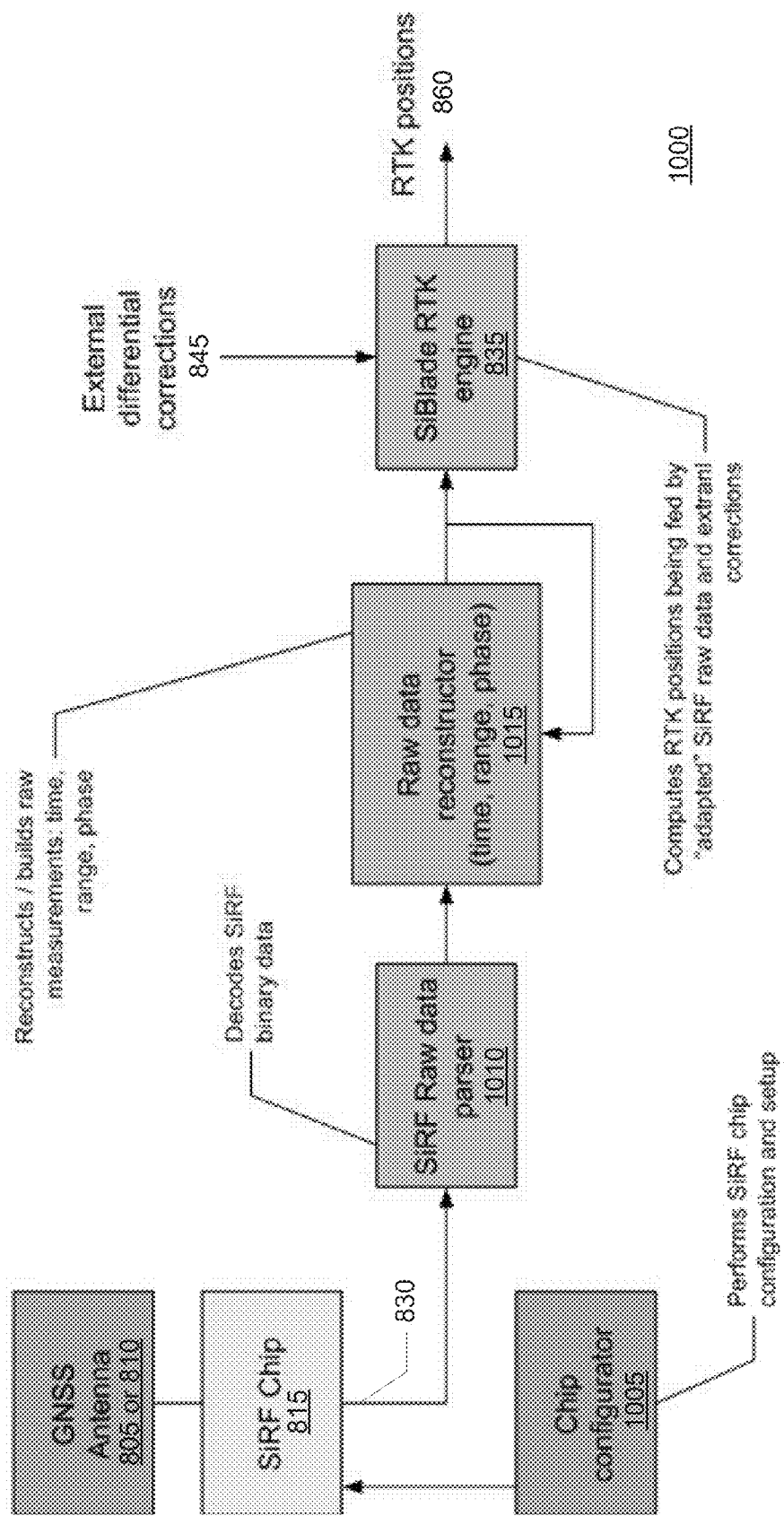
FIG. 10 shows a diagram of a receiver architecture in accordance with some embodiments of the invention.

FIG. 10 shows at 1000 a more detailed diagram of a receiver architecture in accordance with some embodiments of the invention.

The consumer chip 815 (e.g., SiRF chip) connected to an internal GNSS antenna 805 or external GNSS antenna 810 can generate raw tracking data 830 along with the chip's own position estimate. These raw tracking data 830 can be requested from the chip 815 by a special chip configurator 1005. See, for example, *SiRF Binary Protocol Reference Manual*, SiRF Technology, Inc., Part Number 1050-0041, Revision 2.4, November 2008. These data are intercepted by a raw data decoder/parser 1010 which sends them to a Raw Data Reconstructor module 1015. The Raw Data Reconstructor module 1015 generates RINEX-like observables for positioning engine 835. Positioning engine 835 processes RINEX-like observables optionally with external differential (RTK) corrections 845 and generate position estimates 860 of quality which is usually much better than the quality of the internal SiRF chip position estimates.

Figure 11:
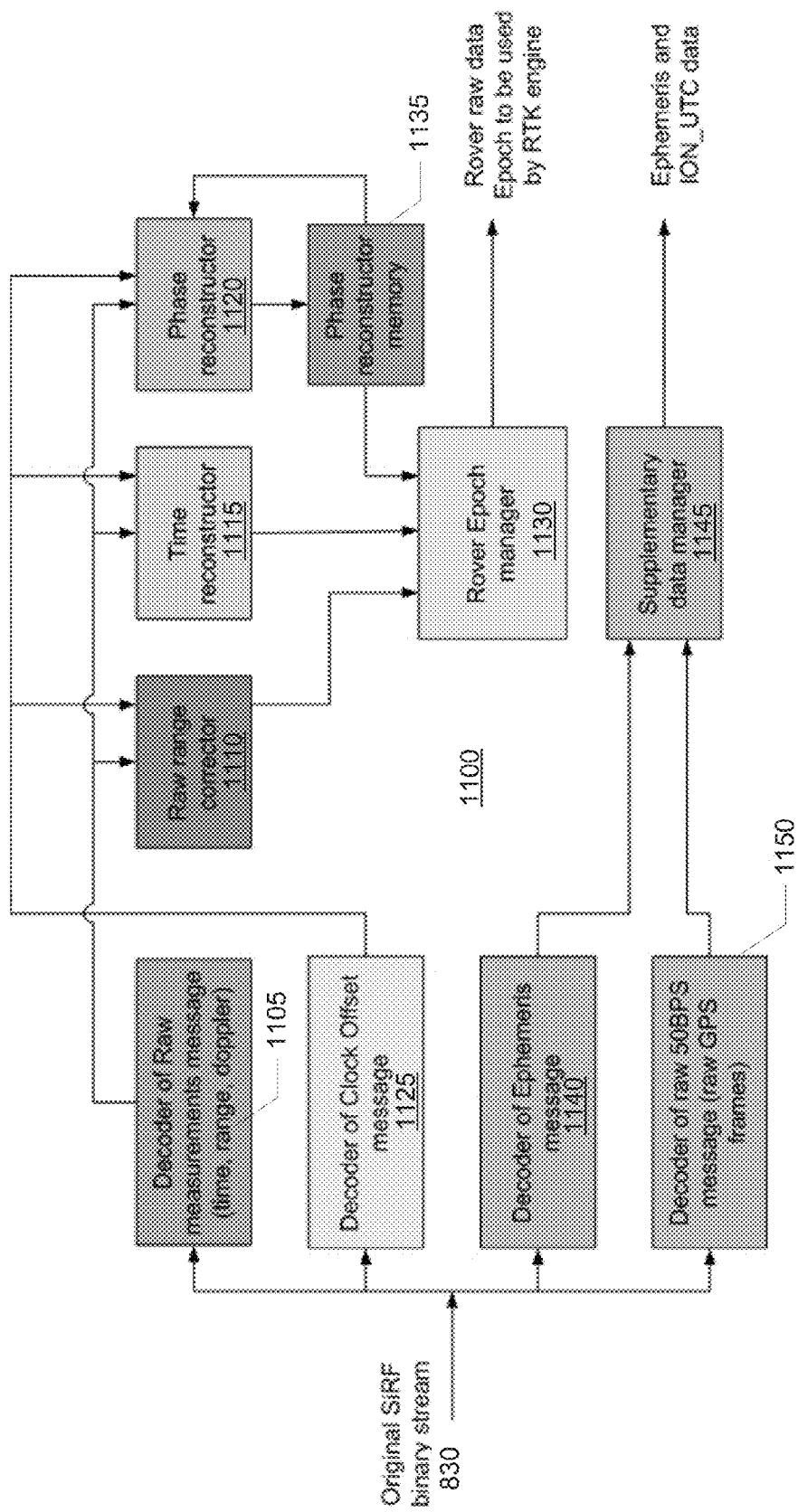
FIG. 11 shows details of the data reconstructor of FIG. 10 in accordance with some embodiments of the invention.

FIG. 11 shows at 1100 more details of the data reconstructor 1010. The binary data stream 830 from the consumer chip 815 is supplied to a raw-measurements-message decoder 1105 which extracts time, range and Doppler data and supplies these to a raw range corrector 1110, a time reconstructor 1115 and a phase reconstructor 1120. A clock-offset-message decoder 1125 extracts clock offset data and supplies these to the raw range corrector 1110, the time reconstructor 1115 and the phase reconstructor 1120. Raw range corrector 1110 supplies reconstructed range data to rover epoch manager 1130. Time reconstructor 1120 supplies reconstructed time data to rover epoch manager 1130. Phase constructor 1120 communicates with a phase reconstructor memory 1135 which supplies reconstructed phase data to rover epoch manager 1130. Rover epoch manager 1125 supplies the reconstructed rover raw data to the position engine 835.

The four types of original data are of interest
Raw tracking data themselves
Receiver clock correction message
Ephemeris message
Original Broadcast GNSS binary data The first two groups serve restored RINEX-like observation data, the third and fourth groups allow getting complete RINEX-like orbit, clock, ionosphere data needed to compute Sat positions and corrections.

Tuning Professional Position Engine (Any Consumer Chip)

Once observations in proper presentation form enter position engine, it can process them [together with incoming external differential data] using the very same algorithms and parameters as applied in professional solutions. But the quality of professional-grade observables is much better than that of restored consumer-grade data.

The differences are caused by:
The restored carrier phase (SiRF Star III chip) has all the attributes of a true carrier phase, except that it has a fractional bias that is different for each satellite, and it can also change on each signal re-acquisition.
The receiver clock bias in restored carrier phases and pseudo-ranges appears to be different and drifting.
Because of low-band front-end RF and cheap antenna element, the resulting observables are affected by strong multipath errors which can be ten times higher compared to professional, wideband front-end RF/antenna in the same conditions.
Because of the high sensitivity of the consumer chip acquisition/tracking engine, satellites with very low SNR are tracked and provide observables.

The differences correspondingly appear as:
Any Double Difference (DD) processing involving carrier phase restored from SiRF Star III chip data cannot lead to DD carrier ambiguity fixed to integer. This is not a strong limitation because, for L1-only handhelds fitted with a cheap internal antenna, fixing ambiguity to integer, if ever possible, cannot be reliable.
Code-carrier combination is drifting for each Sat, which is not the case with observables from professional receiver. For engines applying DD processing, this divergence does not affect final performance. However, some operations in which raw data are involved can be affected. For example, effective long smoothing of pseudo-ranges by carrier-phase is not possible with such data.

The noise and multipath errors in restored observables are much higher than in professional devices and not so predictable and not so well flagged in supplementary indicators.

The probability to have observables corresponding to reflected (not line-of-sight) signal is very high in shaded/urban environment The following parts of engine algorithms must be reviewed:

So called input guard procedure which makes preliminary raw data deselecting by quite obvious criteria, like SNR, out of range value etc. These procedures run before positioning engine. For example, SNR threshold which is usually about 35 dBHz, should be set to smth about 27 dBHz for Si-BLADE running in consumer device.

So called build-in guard procedure which deselects medium range data outliers. This procedure is tightly coupled with position engine itself and can be multi-iterative.

Outliers in professional devices are usually clearly seen and can be easily deselected. In consumer devices, often it is not possible to clearly distinguish between admissible data and outliers, so possibility of soft deselecting rule (not block the data but downweight them compared to nominally assigned weight) must be implemented.

Positioning algorithms itself, which includes observation weighting rules and carrier phase ambiguity processing. In must be noted that to insure admissible position result with consumer-grade data, position engine must be built as a filter (e.g. Kalman or Kalman-like) rather than independent epoch-by-epoch Least Mean Square engine.

It is proven that only filter can be applied for such a data.

Post positioning algorithms which include estimating achieved position accuracy and masking positioning output based on different indicators. The value of this procedure is very high and it was created and tuned as described below.

The above procedures (and their default parameters) are build in assumption that professional grade observations enter PVT engine. And position of quality of few meters is out of interest of end user. With observation data from consumer-grade chips/antennae and acceptance of meter level quality positions for end user, the above procedures must be re-tuned.

The following parameters of engine algorithm must be re-tuned:

Input guard thresholds must be changed to allow worse (than usually) data entering position engine. This dictates not only more democratic rules of raw data acceptance for further processing, but also additional indication of raw data quality, e.g. expected rms value of multipath error in pseudo-range and probability of unrepaired cycle slip in restored carrier phase. One of the algorithms to estimate the rms value of multipath error is smoothing code-carrier combination and estimating smoothing residuals. The RMS value of these residuals can be a measure of m/p error. Unlike professional receivers and high grade antenna which usually feature no more than meter level multipath, consumer chips in couple with low cost internal antenna can demonstrate up to 10 meters multipath error.

Built-in guard usually applies chi-square criteria to deselect or (de-weight) some particular observables. Chi-square statistic is compared to some pre-defined thresholds which must be re-tuned for reconstructed data. When working with professional grade observables, chi-square threshold is typically set to deselect data code with 3+ meter errors. At the same time such errors are typical for consumer devices. Here guard must be tuned with criteria to pass up to few tens meter errors, but block>50 meter errors which usually correspond to indirect (only reflected) signal.

Observables weighing matrix must be completely overseen. First of all, the scaling factor between quality of pseudo range vs. carrier errors (in professional products it is smth about 1 m vs. 1 cm) must be overseen in favor of smth like 10 meters vs. 1 cm. Second, the weighting procedures between Sats must be completely re-tuned taking into account the ability of consumer chip to track super-weak signals. Third, the weighting procedures must be tuned for each built-in antenna element which pattern vs. elevation can be vary from one design to another. The potential ability of code-carrier divergence must be accounted by special release of receiver clock model. One of challenging tuning actions is to build proper model of internal antenna pattern which can be unique for given type of receiver. Tuning algorithms must take into account that mostly the unit will be held in optimal position (e.g 45 degrees to horizon and against chest). So proper antenna pattern must be measured and used in weighting scheme.

Final position estimate is usually accompanied with its quality indicator, e.g. estimate of achieved position rms error. The engine can block position output to user if rms estimate indicate very poor quality. The algorithms of rms estimate and position blocking thresholds must be reviewed. The presented algorithms must deliver sub-meter accuracy. But this accuracy cannot be delivered just after start up or just after leaving heavy canopy. So adequate rms figure must be computed. While in professional receivers, there is usually very clear indication of achieved accuracy based on carrier ambiguity status (fixed, i.e. cm error, or float i.e. meter error), for Si-Blade position cannot be distinguished by ambiguity flag. That is why very careful rms computation algorithm must be implemented based on magnitude and temporary correlation of post fit residuals.

The handheld-device populating consumer chip is usually applicable in the widest range of environments, starting from open sky to deep forests or urban canyons. Plus, a handheld unit is usually kept behind a user's chest which also adds shading/multipath for Sats (GNSS satellites) coming in respective directions. Clearly that performance cannot be the same in open and shaded area. But it is clear also that run-time position engine parameters must be equally the best for open and shaded conditions. It is not usually possible to find out equally the best fixed parameters serving opposite cases. That is why a position engine working with consumer chip data must apply robust algorithms to detect the environment (e.g. among 4 groups: open sky, partially shaded sky, forest, urban canyon) and set up run time parameters accordingly.

The above tunings/modifications allow getting finally SiBlade position of much better quality compared to internal consumer chip position.

The following describes in detail how to check/test/demonstrate Ashtech Si-BLADE technology on the MobileMapper 10 (MM10) unit by means of a demo application.

The MM10 unit includes:

SiRF chip which can generate original SiRF binary raw data

Built-in GSM module
Application processor

The real time application runs under Windows Mobile OS. It gets original SiRF raw data (binary messages IDs 7, 28 and 41), converts them into RINEX-like form and runs Si-BLADE engine.

The application is also able to feed the Si-BLADE position engine with an external correction stream delivered by the built-in GSM module. As result one can get position estimates of up to Float RTK quality with SiRF-based unit in real time, applying powerful Si-BLADE Ashtech PVT technology.

The following is a short Help to:
Configure SiRF chip
Run Ashtech Si-Blade
Show the results First of all one should set up the SiRF chip into binary output mode because the output is configured as NMEA by default (after power on). It may be done by means of original SiRF utility. Run it (SiRFDemoPPC icon 1205 in FIG. 12A).

Figure 12B:
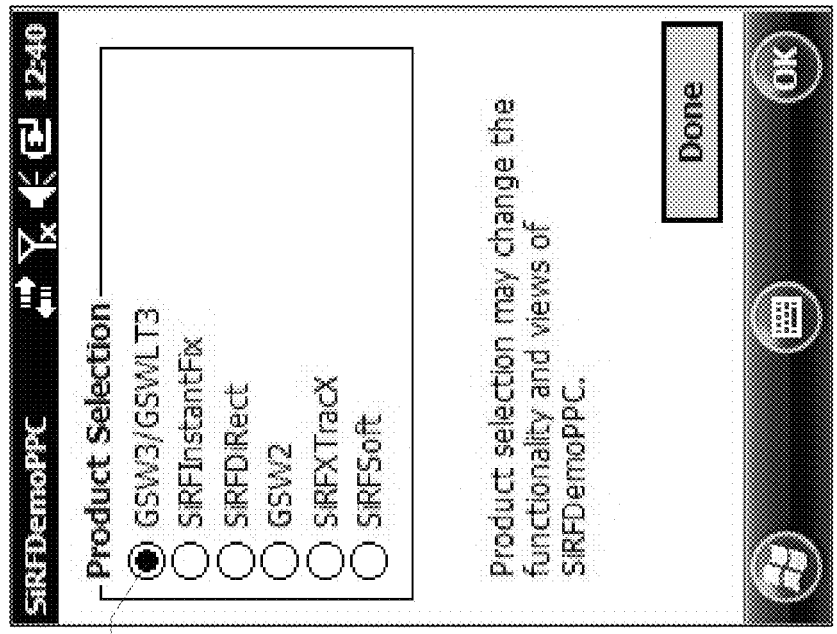
FIG. 12B shows a selection screen of an application in accordance with some embodiments of the invention.
Figure 12A:
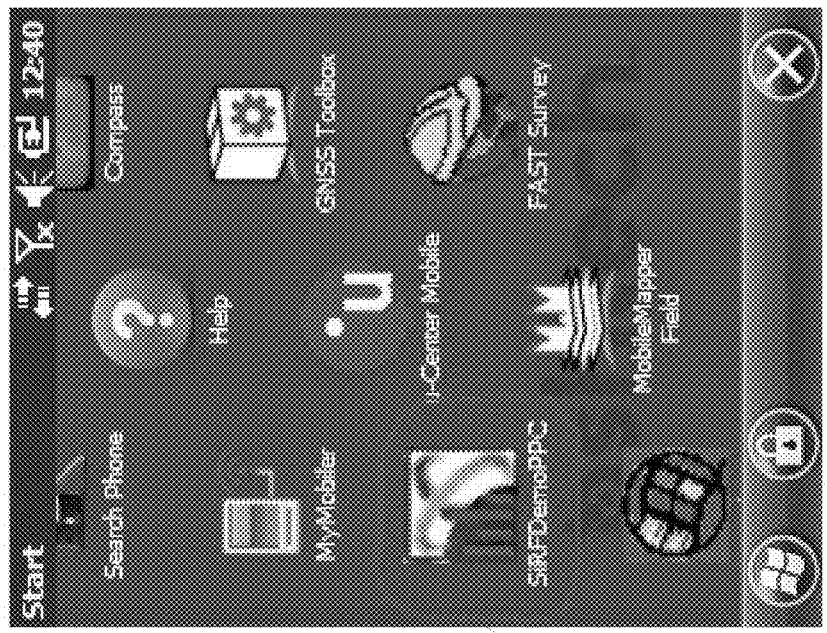
FIG. 12A shows the start screen of an application in accordance with some embodiments of the invention.

Select GSW3/GSWLT3 type of chip as shown at 1201 in FIG. 12B and press Done button.

Figures 13A, 13B:
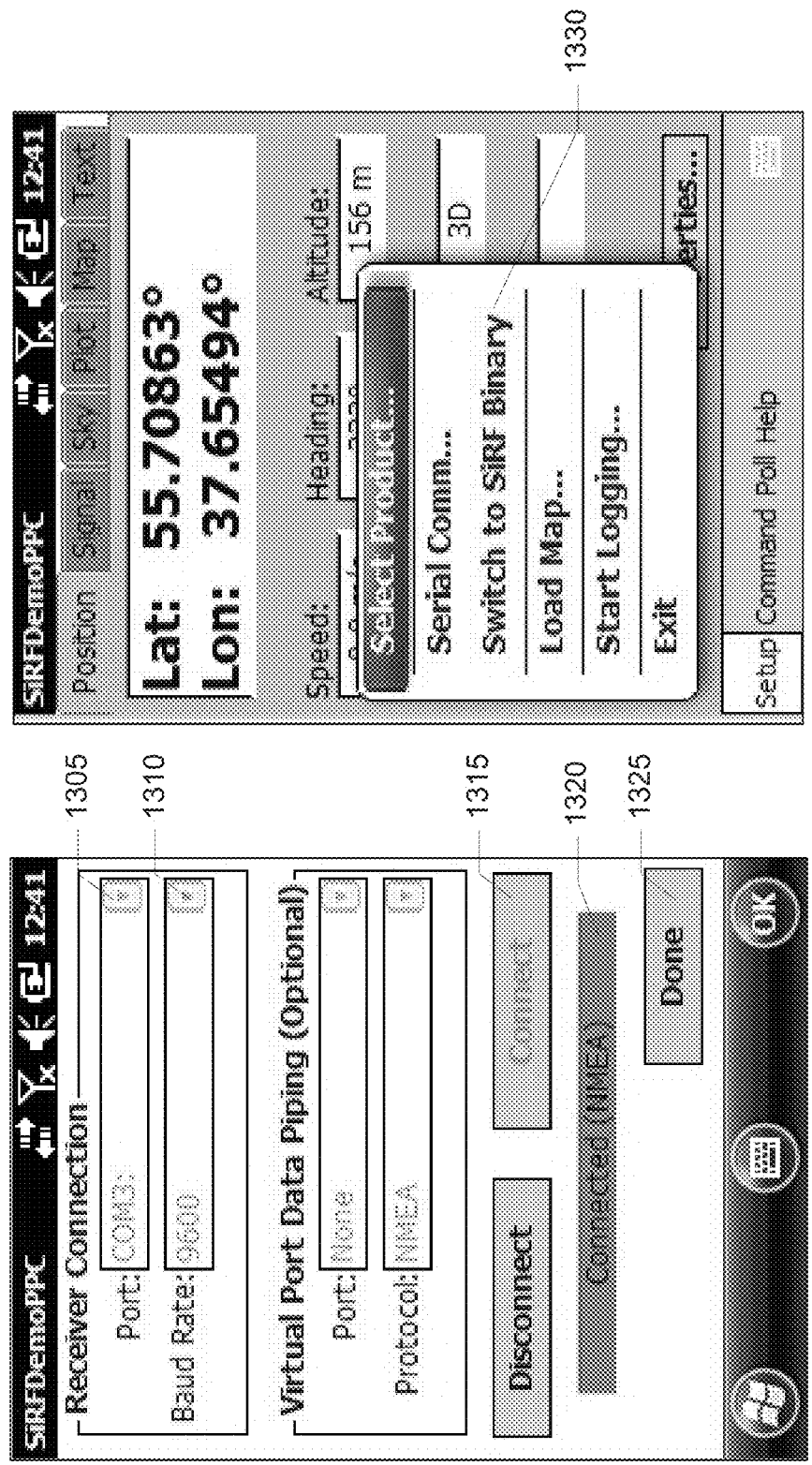
FIG. 13A shows a connection screen of an application in accordance with some embodiments of the invention.
FIG. 13B shows a selection screen of an application in accordance with some embodiments of the invention.

Select the COM3 serial port and 9600 baud rate, as shown at 1305 and 1310 respectively in FIG. 13A. Press Connect button 1315. The "green" message ("Connected (NMEA)") at 1320 should appear. Press Done button at 1325 next.

Select Setup->Switch to SiRF Binary menu item 1330, as shown in FIG. 13B. The chip will be reconfigured into binary mode. Once it is done you may close the application.

Figure 14B:
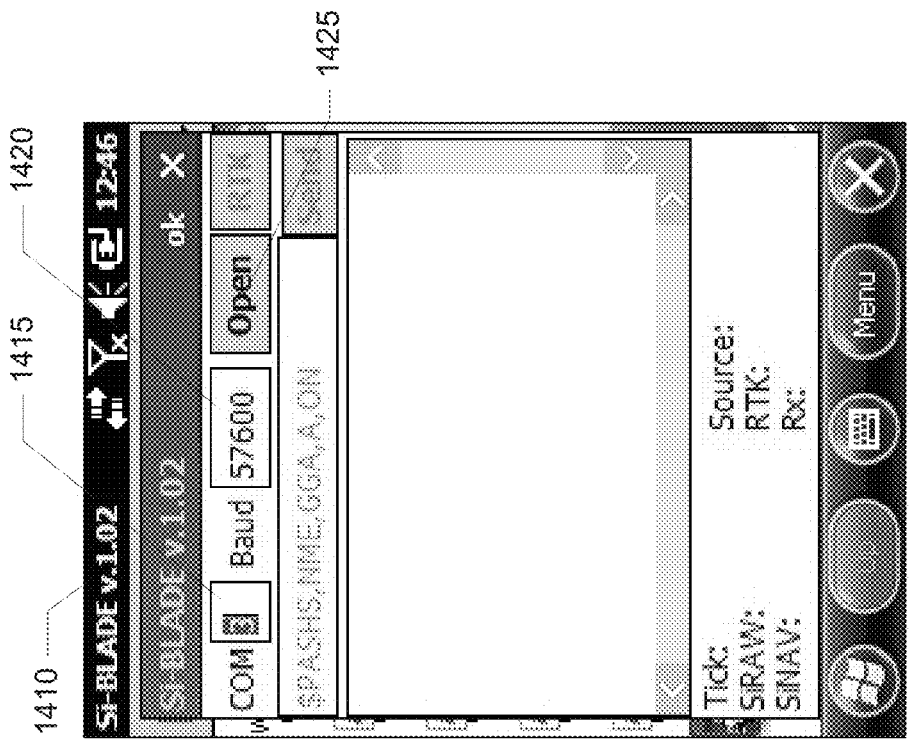
FIG. 14B shows a connection selection screen of an application in accordance with some embodiments of the invention.
Figure 14A:
FIG. 14A shows an application selection screen in accordance with some embodiments of the invention.

Then run the Si-BLADE application itself. Run SiBlade-.exe executable as shown at 1405 in FIG. 14A.

The demo application is a GUI (Graphical User Interface) Windows-based tool. The window shown at 1410 in FIG. 14B becomes visible.

Enter COM as 3 and baud as 57600, as shown at 1415 and 1420 respectively, and press Open button 1425. The "optimistic" ("Everything is ok . . . ") message at 1505 of FIG. 15A appears in 5-6 seconds. Press Ok at 1510.

Figures 15A, 15B:
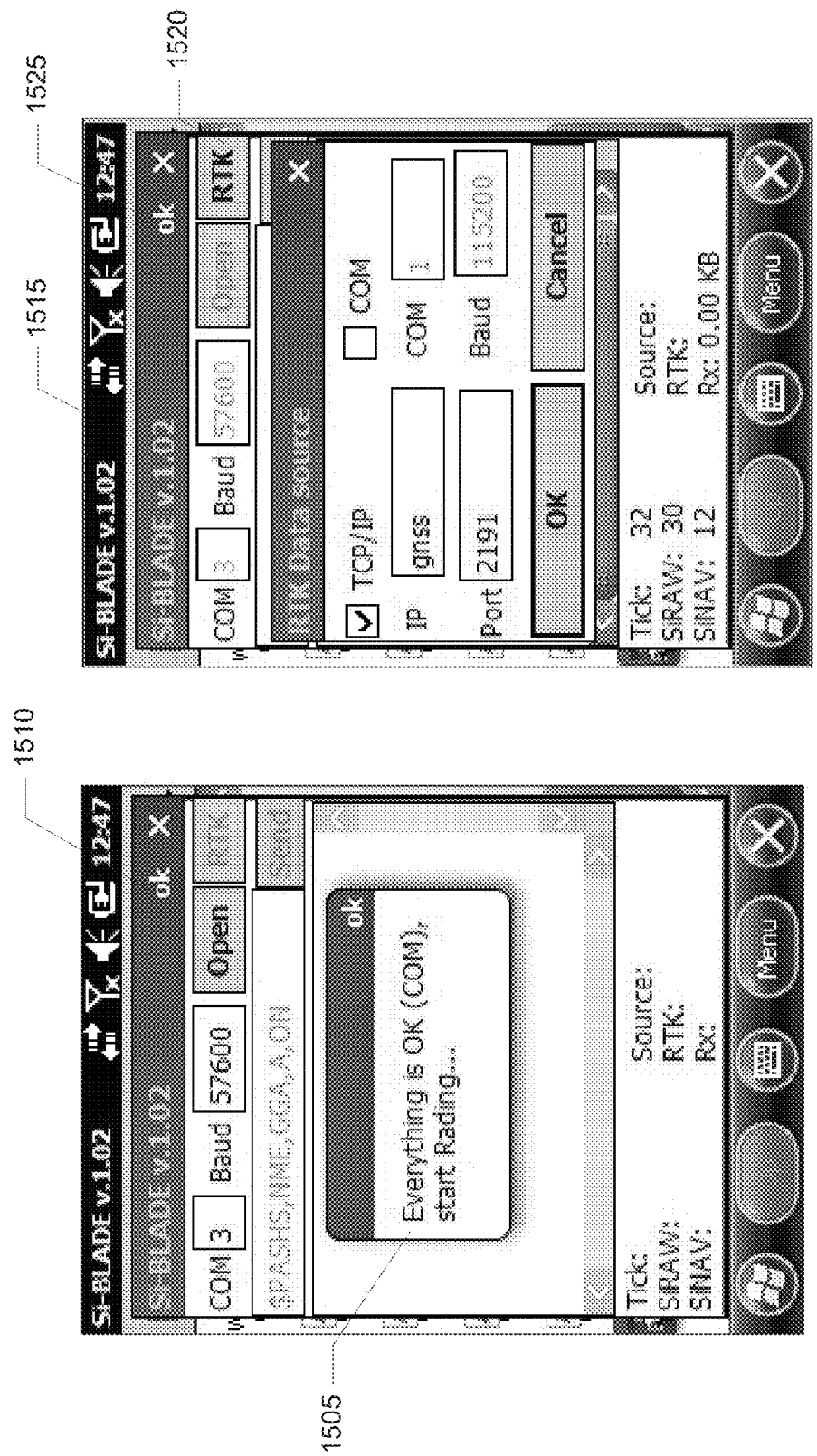
FIG. 15A shows a message screen of an application in accordance with some embodiments of the invention.
FIG. 15B shows a correction source selection screen of an application in accordance with some embodiments of the invention.

Finally the RTK correction source is set up, as shown at 1515 in FIG. 15B. The application is able to get external corrections via network or serial port. Network connection allows getting corrections via DirectIP service. MM10 supports network access by means of a built-in GSM module. The demo application assumes a network connection is already established (access into Internet), i.e. the tool doesn't perform GSM module configuration. How to setup the GSM module and establish access to Internet is described below.

Press the RTK button 1520 to select the type of connection and specify required parameters. The setup dialog becomes visible. Select desired source of corrections and appropriate parameters. DirectIP (direct TCP/IP connection to specified TCP port) and COM port sources are supported.

Figure 16:
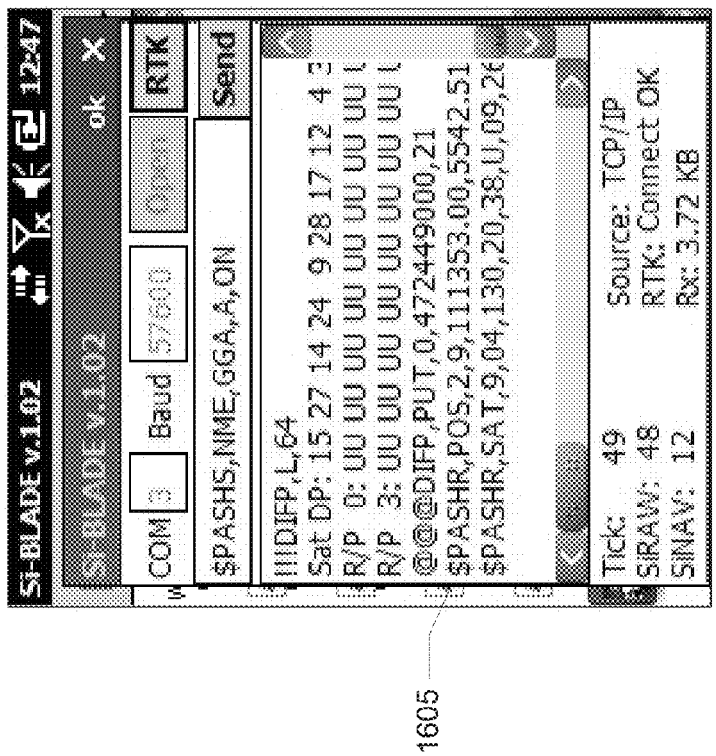
FIG. 16 shows a data screen of an application in accordance with some embodiments of the invention.

Once OK button at 1525 is pressed, Si-BLADE is provided with corrections. As result, one can get up to FLOAT position in real-time (see POS type field in the output window 1605 of FIG. 16).

Figure 17:
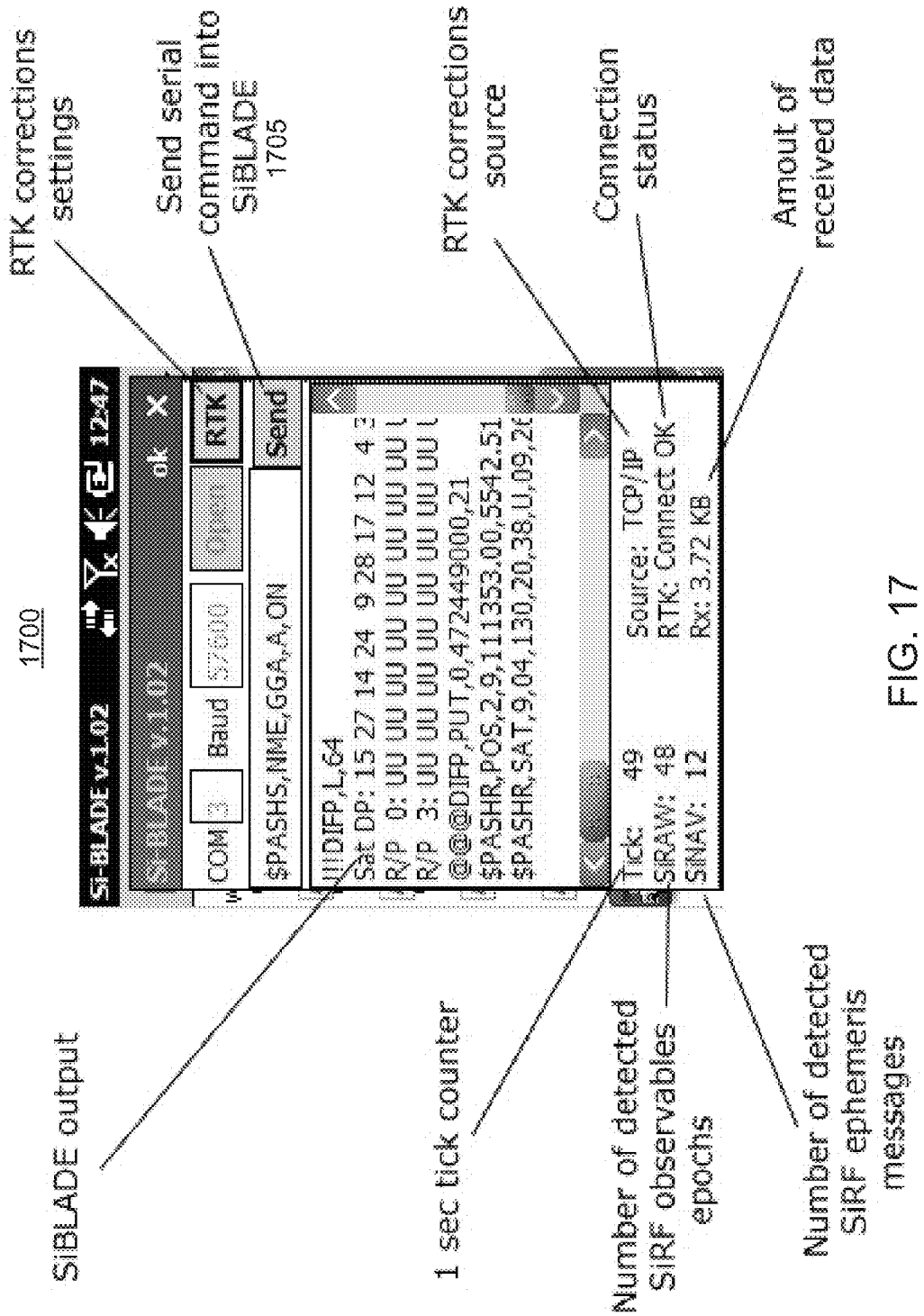
FIG. 17 shows features of a data screen of an application in accordance with some embodiments of the invention.

FIG. 17 illustrates at 1700 the meaning of controls (buttons, edit-boxes, info strings). It should be noted that the Si-BLADE engine "understands" almost all serial commands supported by Ashtech GNSS FW (firmware). One can send desired command by means of Send button 1705.

Figure 18:
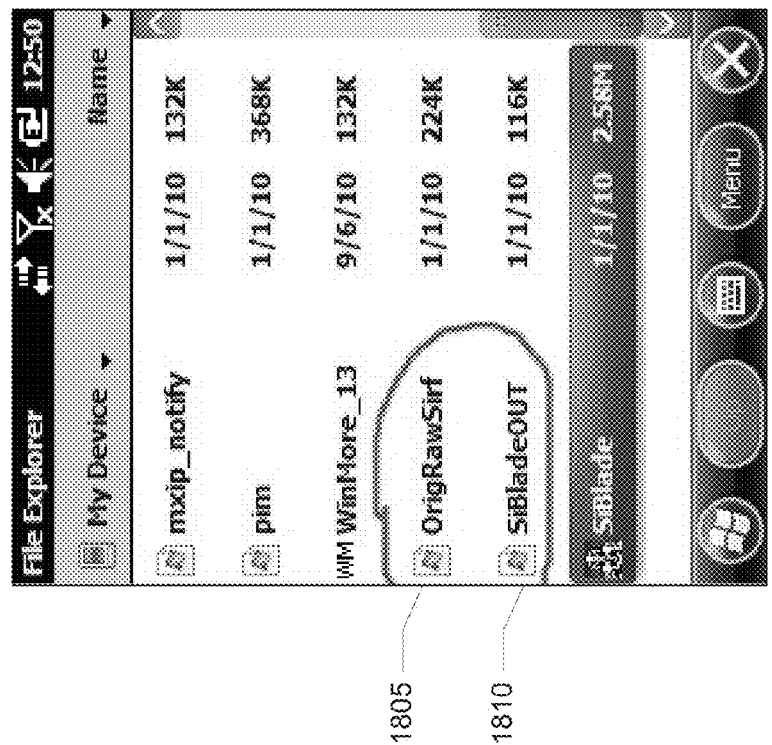
FIG. 18 shows a stored file of raw data and a stored file of data processed with an application in accordance with some embodiments of the invention.

The application saves original SiRF binary output in OrigRawSirf.log file, as shown at 1805 in FIG. 18. Given data can be then converted into Ashtech format for post-processing in the office. Si-BLADE engine output is also saved automatically in the SiBladeOut.log file shown at 1810. These data can be the used for postvisualization by different tools and/or (if atl.log recorded) for running Si-BLADE off line. Both files are located in the root directory (/My Device).

Figure 19B:
FIG. 19B shows a selection screen of an application in accordance with some embodiments of the invention.
Figure 19A:
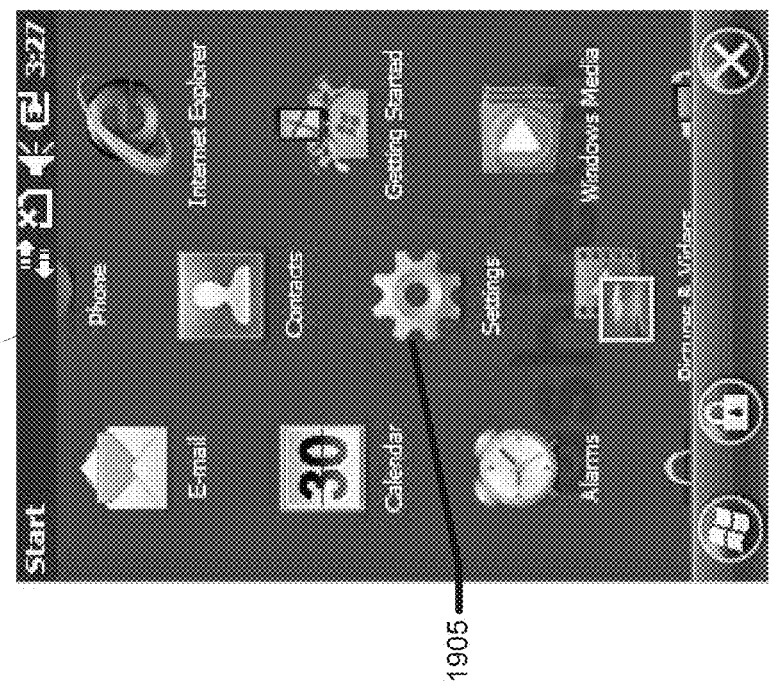
FIG. 19A shows a selection screen of an application in accordance with some embodiments of the invention.

To configure the GSM module, go to the start menu 1900 shown in FIG. 19A and select the Settings icon 1905.

Press Connections icon next, as shown at 1910 in FIG. 19B.

Figures 20A, 20B:
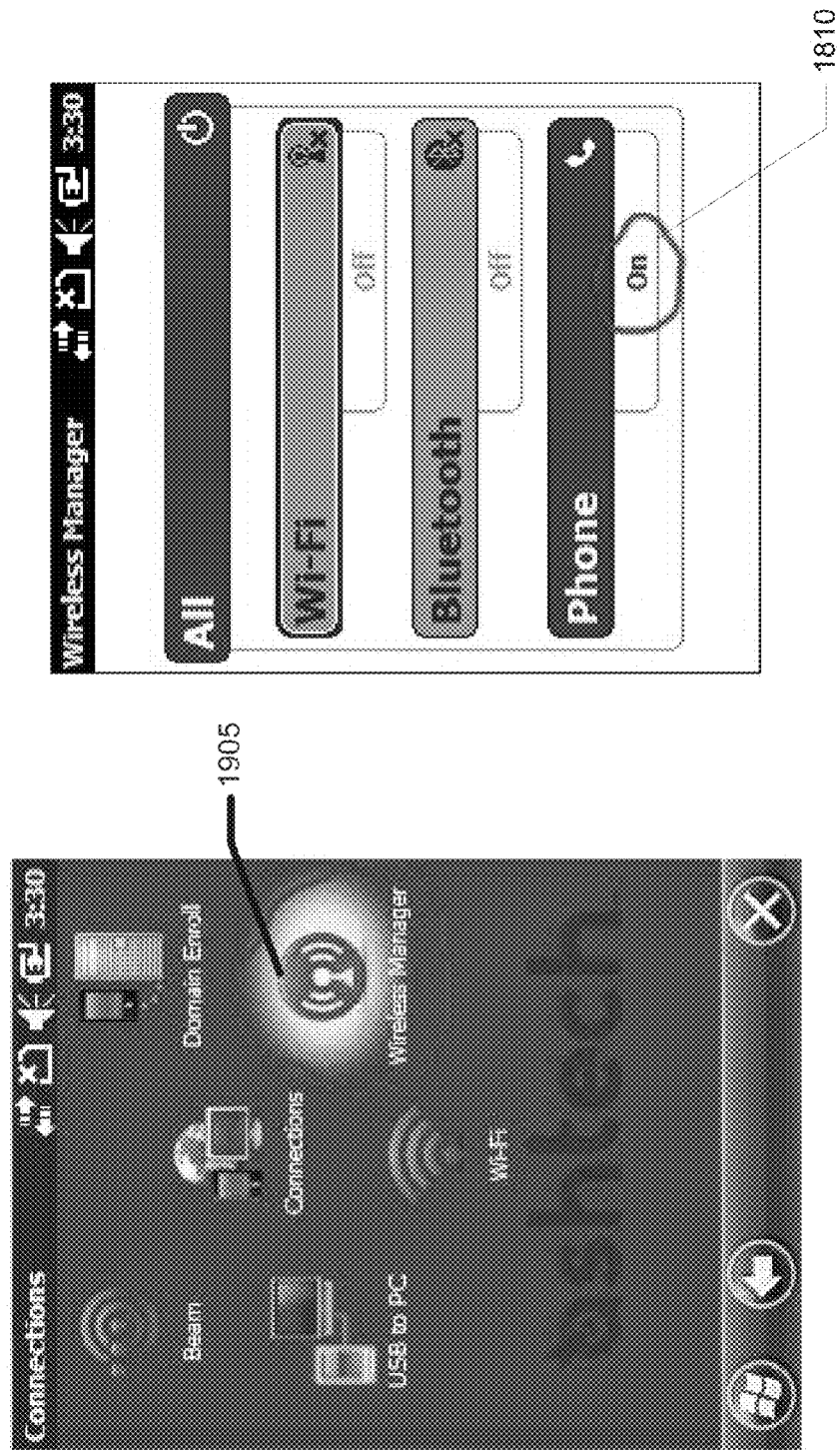
FIG. 20A shows a selection screen of an application in accordance with some embodiments of the invention.
FIG. 20B shows a status screen of an application in accordance with some embodiments of the invention.

Select Wireless Manager icon, as shown at 2005 in FIG. 20A.

Check that Phone (GSM module) is ON, as shown at 2010 in FIG. 20B.

Turn back to the previous menu and select Connection icon in order to setup GPRS settings, as shown at 2105 in FIG. 21A.

Press Add a new modem connection link, as shown at 2110 in FIG. 21B.

Enter the connection name at 2205 (whatever you like) and select Cellular Line (GPRS) modem type 2210, as shown in FIG. 22A. Press Next button.

Next enter GPRS connection credentials, as shown at 2220 in FIG. 22B. The example is based on the credentials provided by Russian cell operator MTS. Please contact your local cell operator for GPRS credentials. First of all you should enter ANP (access point name) value. Press Next button 2225.

Figure 23:
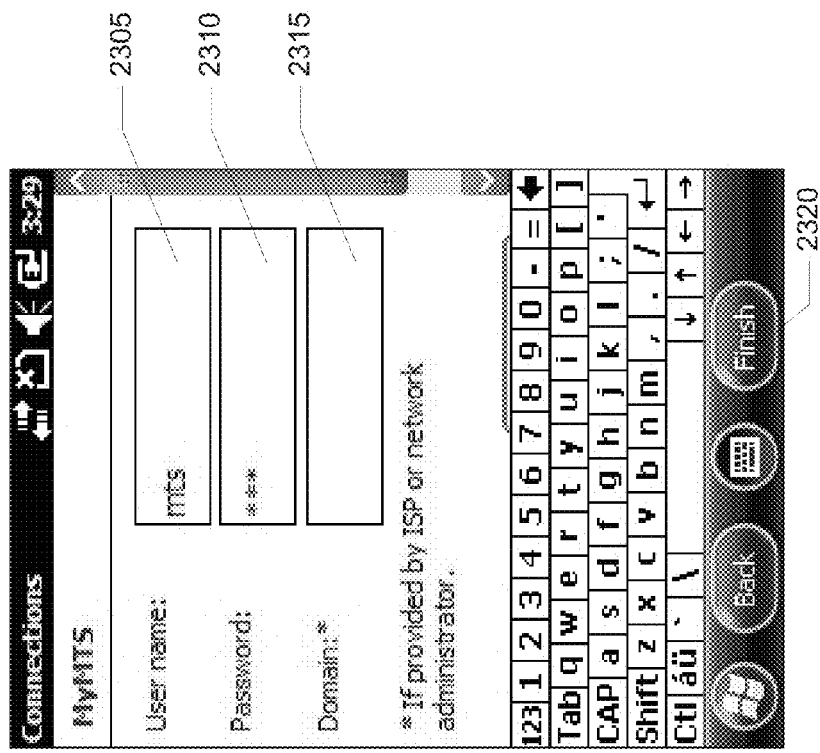
FIG. 23 shows a connection entry screen of an application in accordance with some embodiments of the invention.

Then user name and password follow, as shown at 2305 and 2310 respectively in FIG. 23. Usually Domain field 2315 is left blank. Press Finish button 22320.

Si-BLADE with RTX Data: Performance Assessment

Si-BLADE is a special build of the Ashtech GNSS firmware platform (including positioning engine and all needed supplementary procedures) which can run on Win Mobile targets and process on-line binary SiRF observation data [and external correcting data]. Depending on availability of correcting data Si-BLADE can deliver, standalone, differential and Float RTK positions.

Si-BLADE can also run off-line as Windows PC command line executable with pre-collected raw [and differential] data. Off-line and on-line performance of Si-BLADE must be equal.

RTX is a broadcast corrections service generating State Space (SS) corrections. It is a proprietary Trimble service. SS corrections can be converted into Measurement Space (MS) corrections for a pre-specified location. This conversion process can be done in real time (on-line) and in post processing (off-line) and results in generating VRS data for a specified position. MS corrections (VRS) accuracy will depend on availability and accuracy of all possible SS components including local area ionosphere and troposphere data.

We recorded data to investigate what accuracy Si-BLADE can deliver on typical SiRF based GIS receiver when RTX corrections are available in form of VRS MS data.

Test Setup

Ashtech MobileMapper10 (MM10) receiver was installed on exactly known static open-sky position in optimum orientation. Internal antenna used. Original raw data (*.grw file) was recorded during 24 hours at 1 second interval.

Ashtech ProFlex500 receiver was running about 1.5 km apart and recording reference data at 1 Hz for the same time window.

The variety of these data was processed by Si-BLADE PC version to address performance for different configurations.

The lat/lon plots of FIG. 24, FIG. 25, FIG. 26 and FIG. 27 show the result of continuous uninterrupted runs of the following configurations:

SiRF: internal SiRF chip position (dark-colored plots 2405 and 2505, reported as standalone)

Si-BLADE RTK: position computed by Si-BLADE w/ applying correcting data from FroFlex500 (dark-colored plots 2410 and 2510, reported as RTK float)

Si-BLADE VRS: position computed by Si-BLADE w/ applying correcting data from VRS generated from RTX SS data (light-colored plots 2415 and 2515, reported as RTK float).

Figure 24:
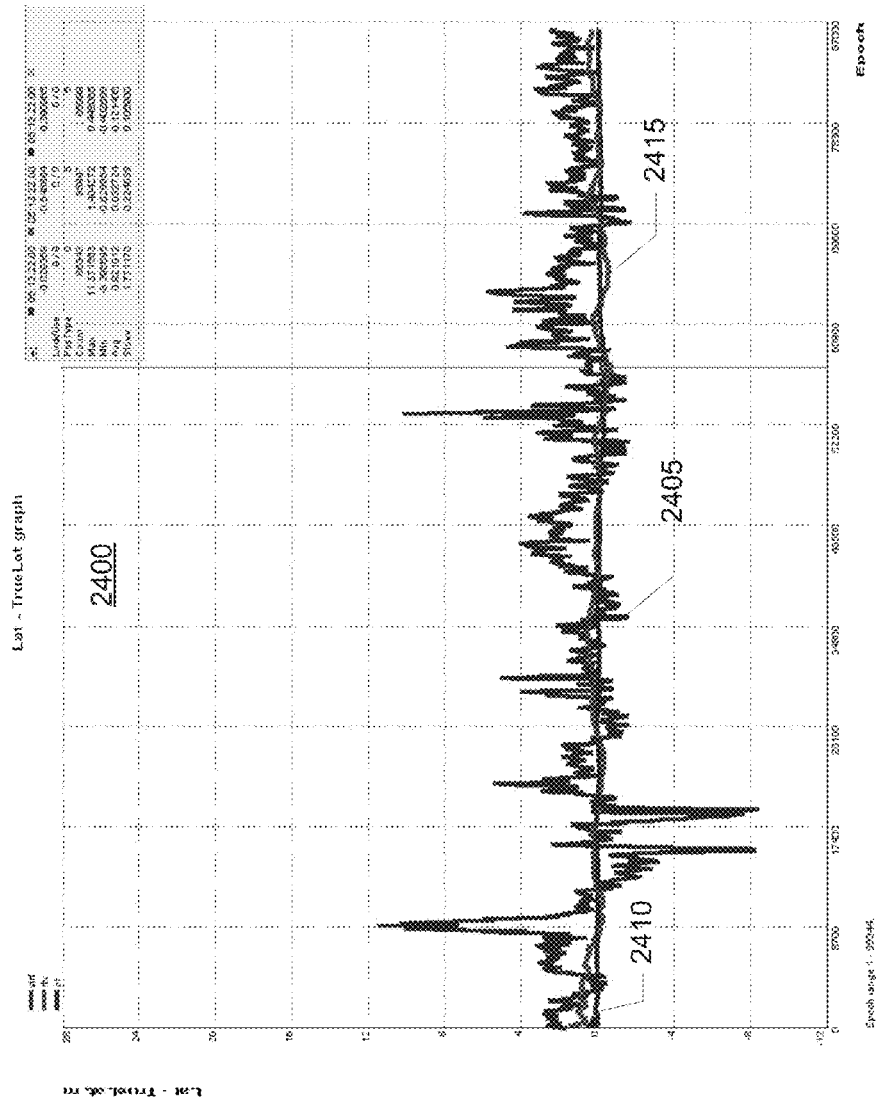
FIG. 24 shows a graph of latitude estimates in multiple configurations.
Figure 25:
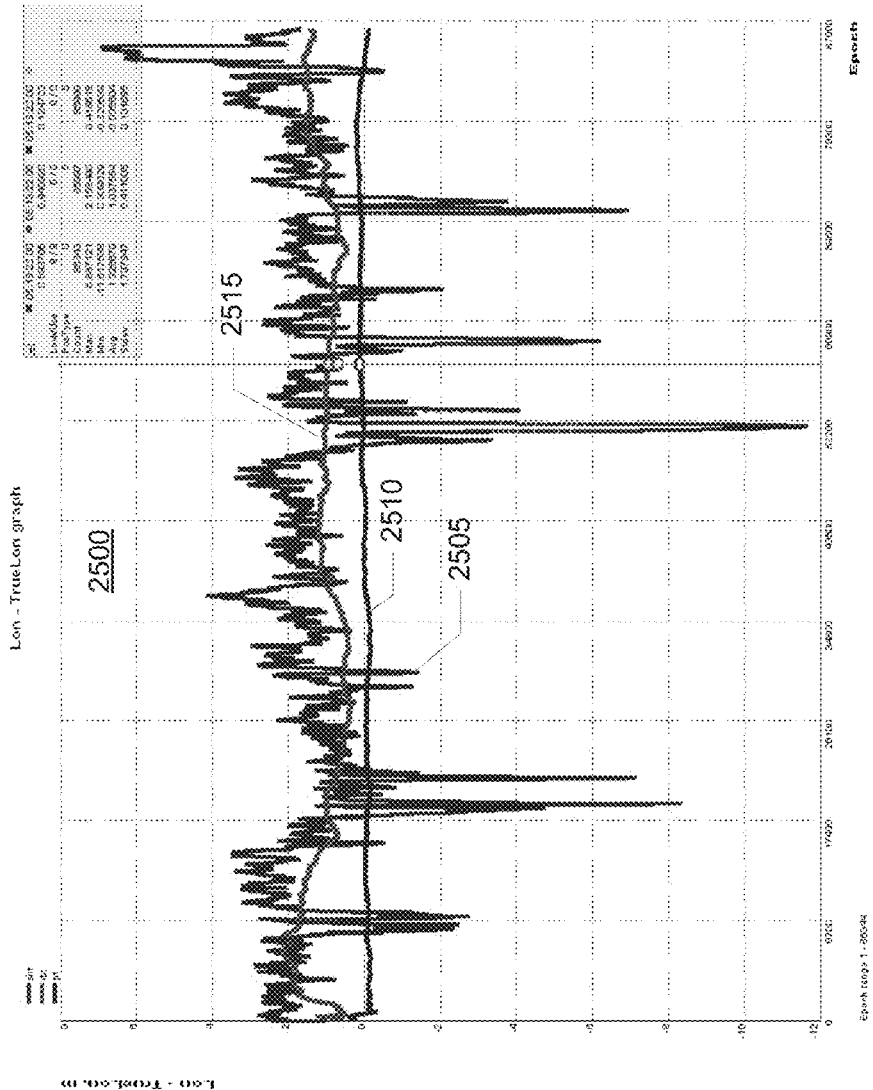
FIG. 25 shows a graph of longitude estimates in multiple configurations.
Figure 26:
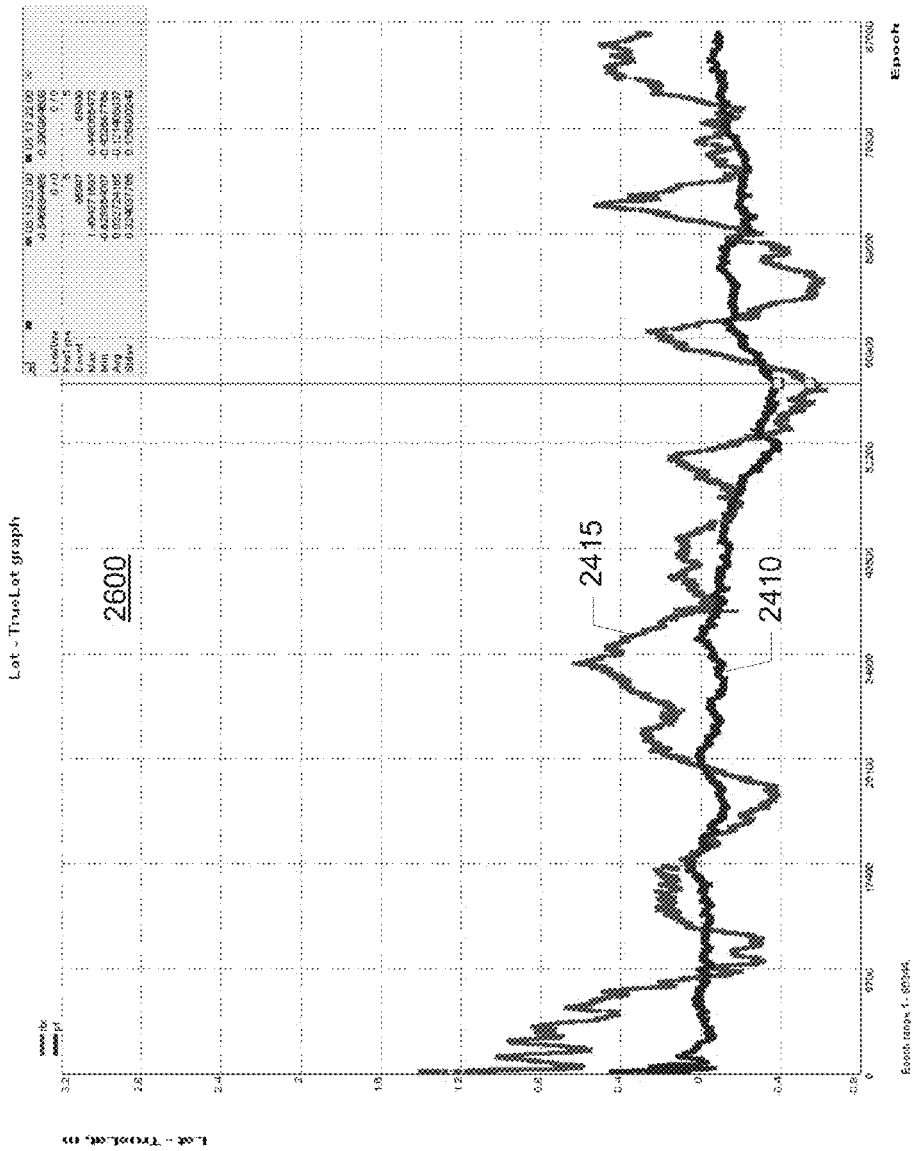
FIG. 26 shows a graph of latitude estimates in multiple configurations.
Figure 27:
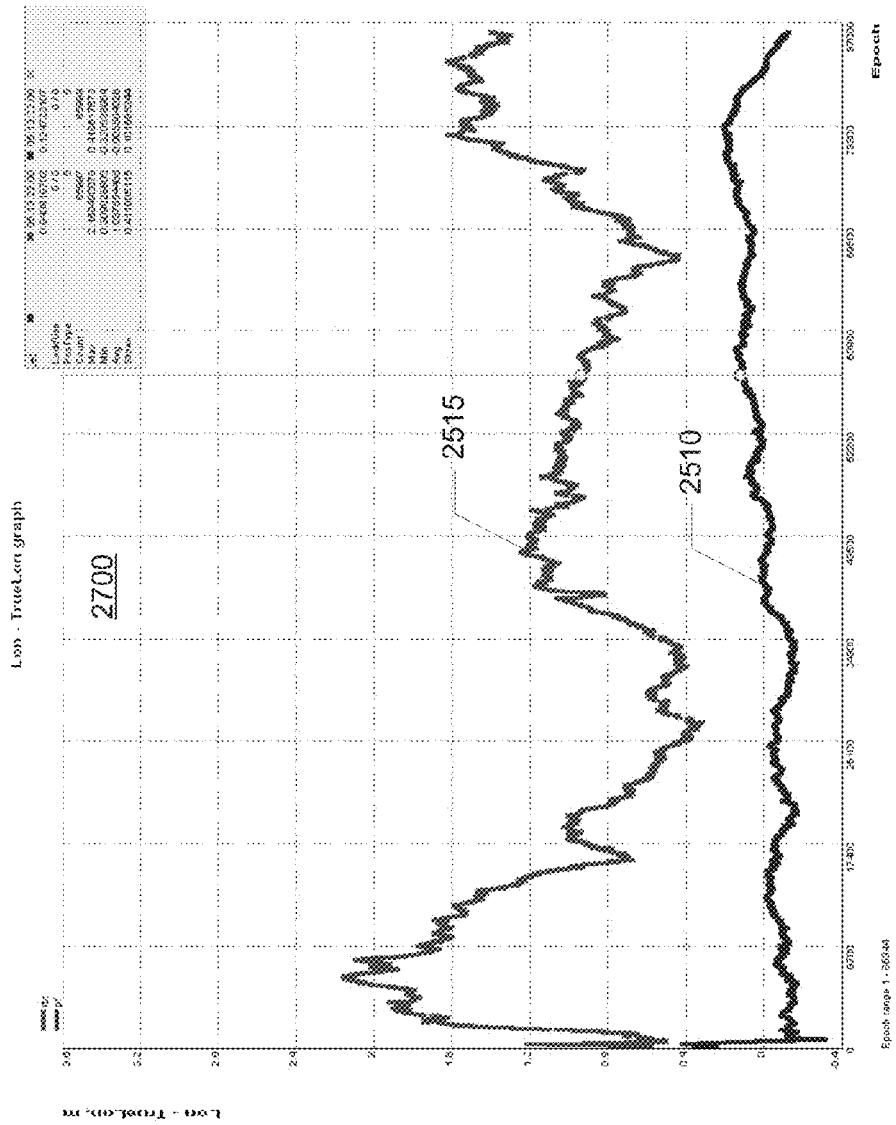
FIG. 27 shows a graph of longitude estimates in multiple configurations.

Since the SiRF chip's own-position position errors dominate in the plots of FIG. 24 and FIG. 25, we repeat them in FIG. 26 and FIG. 27 respectively but without the SiRF chip's own positions. One can clearly see the difference in accuracy.

Statistic (Continuous Run)

Table 2 shows the accuracy (against known position MM10 was installed on) of continuous uninterrupted runs described above. The statistic includes initial convergence period, but it actually hardly affect final figures. We also added the last line to show that using consumer grade data (MM10) and professional grade data (PF500) with RTX/VRS correcting data, gives very similar performance.

TABLE 2

Accuracy of Continuous Uninterrupted Runs

| Data Name | Baseline [m] | Epochs | HRMS [cm] | H50 [cm] | H95 [cm] |
|---|---|---|---|---|---|
| SiRF | N/A | | | | |
| Si-BLADE VRS | 0 | 85998 | 116.650 | 104.210 | 190.720 |
| Si-BLADE RTK | 1344 | 86000 | 19.090 | 14.870 | 35.110 |
| VRS->PF500 | 1344 | 85999 | 92.100 | 85.900 | 130.520 |

Convergence Tubes (BLADE Auto-reset)

Tables 3A, 3B and 3C show so-called convergence tubes (in centimeters) when the BLADE engine was reset each 1 hour. One can see that only Si-BLADE RTK demonstrates clearly seen accuracy convergence.

TABLE 3A

Si-BLADE RTK

| Time | HRMS | hor50 | hor95 |
|---|---|---|---|
| 1 | 0.77 | 0.56 | 2.04 |
| 60 | 0.76 | 0.67 | 1.82 |
| 120 | 0.62 | 0.52 | 1.25 |
| 180 | 0.54 | 0.46 | 0.93 |
| 300 | 0.44 | 0.38 | 1.00 |
| 600 | 0.40 | 0.36 | 0.84 |
| 900 | 0.36 | 0.23 | 0.86 |
| 1800 | 0.30 | 0.28 | 0.64 |
| 3600 | 0.26 | 0.20 | 0.58 |

TABLE 3B

Si-BLADE VRS

| Time | HRMS | hor50 | hor95 |
|---|---|---|---|
| 1 | 1.09 | 0.93 | 2.29 |
| 60 | 1.05 | 0.89 | 2.04 |
| 120 | 1.05 | 0.86 | 1.80 |
| 180 | 1.02 | 0.87 | 1.89 |
| 300 | 0.94 | 0.84 | 1.62 |
| 600 | 0.94 | 0.87 | 1.97 |
| 900 | 0.98 | 0.93 | 1.94 |
| 1800 | 1.04 | 1.02 | 1.86 |
| 3600 | 1.08 | 0.86 | 2.01 |

TABLE 3C

VRS->PF500

| Time | HRMS | hor50 | hor95 |
|---|---|---|---|
| 1 | 0.71 | 0.67 | 1.14 |
| 60 | 0.70 | 0.77 | 0.96 |
| 120 | 0.71 | 0.68 | 1.08 |
| 180 | 0.70 | 0.70 | 1.22 |
| 300 | 0.71 | 0.63 | 1.28 |
| 600 | 0.69 | 0.61 | 1.32 |
| 900 | 0.71 | 0.62 | 1.27 |
| 1800 | 0.78 | 0.72 | 1.42 |
| 3600 | 0.81 | 0.83 | 1.30 |

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

In accordance with some embodiments of the present invention, the methods may be implemented on a data processing computer such as a personal computer, workstation computer, mainframe computer, or high-performance server running an OS such as a version of Microsoft® Windows® or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a non-transitory computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of determining a position of an antenna of a global navigation satellite system (GNSS) rover from single-frequency observations of GNSS signals collected at the antenna and from correction data, comprising:
   obtaining, from a GNSS chipset associated with the antenna, coded raw data in a binary format, the coded raw data obtained from the single-frequency observations,
   decoding, external to the GNSS chipset, the coded raw data to obtain decoded raw data, the decoded raw data including receiver clock offset data, measurement time data, pseudorange data, and Doppler data, wherein the measurement time data, the pseudorange data, and the Doppler data are not corrected to account for receiver clock offsets,
   using the decoded raw data to construct a plurality of epochs of measurement data of time, range, and phase, the measurement data constructed by determining the receiver clock offsets using the receiver clock offset data, correcting the measurement time data, the pseudorange data, and the Doppler data to account for the receiver clock offsets, and using the corrected Doppler data to construct the phase,
   obtaining correction data for at least one of the epochs from a source external to the GNSS chipset,
   processing the measurement data with the correction data in a realtime kinematic positioning engine to obtain an estimate of the position of the antenna for each of the plurality of epochs.

2. The method of claim 1, wherein the single-frequency observations are at a GNSS L1 frequency.

3. The method of claim 1, wherein the GNSS chipset is part of a consumer-quality GNSS receiver.

4. The method of claim 3, wherein the consumer-quality GNSS receiver comprises at least one of: a MobileMapper 10 GNSS receiver, a SiRF GNSS receiver chip, a Trimble Juno41 handheld having a Ublox chip, and a Ublox chip.

5. The method of claim 3, wherein the consumer-quality GNSS receiver has at least one of the following characteristics: (a) narrow band RF front end filter, (b) L1 only, (c) raw data output, and (d) approximately 1 Hz data update rate.

6. The method of claim 1, wherein the correction data comprise one of: RTK base station data, L-Band correction data, and SBAS correction data.

7. The method of claim 1, wherein decoding comprises correcting the pseudorange data to obtain the range.

8. The method of claim 1, wherein decoding comprises correcting the measurement time data to obtain the time.

9. The method of claim 1, wherein obtaining the estimate of the position for each of the plurality of epochs comprises determining a float ambiguity for each of the plurality of epochs.

10. The method of claim 1, wherein using the decoded raw data to construct the phase comprises restoring carrier phase for a time sample k as:

$$PHI(k)=PHI(k-1)+D(k)$$

wherein PHI(k) is a carrier phase observable for a time sample k, PHI(k−1) is a carrier phase observable for the previous time sample k−1, and D(k) is a Doppler observable for the time sample k.

11. The method of claim 1, wherein processing the measurement data with the correction data in the realtime kinematic positioning engine to obtain the estimate of the position for each of the plurality of epochs occurs immediately following construction of the measurement data.

12. A computer program product comprising:
   a non-transitory computer usable medium having computer readable instructions physically embodied therein, the computer readable instructions comprising the method of claim 1.

13. Apparatus for determining a position of an antenna of a global navigation satellite system (GNSS) rover from single-frequency observations of GNSS signals collected at the antenna and from correction data, comprising at least one processor with instructions enabling the at least one processor to:
   a. obtain, from a GNSS chipset associated with the antenna, coded raw data in a binary format, the coded raw data obtained from the single-frequency observations, b. decode the coded raw data to obtain decoded raw data, the decoded raw data including receiver clock offset data, measurement time data, pseudorange data, and Doppler data, wherein the measurement time data, the pseudorange data, and the Doppler data are not corrected to account for receiver clock offsets, c. use the decoded data to construct a plurality of epochs of measurement data of time, range and phase, the measurement data constructed by determining the receiver clock offsets using the receiver clock offset data, correcting the measurement time data, the pseudorange data, and the Doppler data to account for the receiver clock offsets, and using the corrected Doppler data to construct the phase, d. obtain correction data for at least one of the epochs from an external source, e. process the measurement data with the correction data in a realtime kinematic positioning engine to obtain an estimate of the position of the antenna for each of the plurality of epochs.

14. The apparatus of claim 13, wherein the single-frequency observations are at a GNSS L-1 frequency.

15. The apparatus of claim 13, wherein the GNSS chipset is part of a consumer-quality GNSS receiver.

16. The apparatus of claim 15, wherein the consumer-quality GNSS receiver comprises at least one of: a MobileMapper 10 GNSS receiver, a SiRF GNSS receiver chip, a Trimble Juno41 handheld having a Ublox chip, and a Ublox chip.

17. The apparatus of claim 15, wherein the consumer-quality GNSS receiver has at least one of the following characteristics: (a) narrow band RF front end filter, (b) L1 only, (c) raw data output, and (d) approximately 1 Hz data update rate.

18. The apparatus of claim 13, wherein the correction data comprise one of: RTK base station data, L-Band correction data, and SBAS correction data.

19. The apparatus of claim 13, wherein decoding comprises correcting the pseudorange data to obtain the range.

20. The apparatus of claim 13, wherein decoding comprises correcting the measurement time data to obtain the time.

21. The apparatus of claim 13, wherein obtaining the estimate of the position for each of the plurality of epochs comprises determining a float ambiguity for each of the plurality of epochs.

22. The apparatus of claim 13, wherein using the decoded raw data to construct the phase comprises restoring carrier phase for a time sample k as:

$$PHI(k)=PHI(k-1)+D(k)$$

wherein $PHI(k)$ is a carrier phase observable for a time sample k, $PHI(k-1)$ is a carrier phase observable for the previous time sample $k-1$, and $D(k)$ is a Doppler observable for the time sample k.

* * * * *